US012783795B2

(12) United States Patent
Seth et al.

(10) Patent No.: US 12,783,795 B2
(45) Date of Patent: Nov. 3, 2026

(54) COMPUTER METHOD AND SYSTEM FOR PARSING HUMAN DIALOGUE

(71) Applicant: HUEX Inc., Woodbridge (CA)

(72) Inventors: Anik Seth, Woodbridge (CA); Jiping Sun, Woodbridge (CA); Yongpeng Sun, Woodbridge (CA); Kiran Kadekoppa, Woodbridge (CA)

(73) Assignee: HUEX Inc., Woodbridge (CA)

( * ) Notice: Subject to any disclaimer, the term of this patent is extended or adjusted under 35 U.S.C. 154(b) by 297 days.

(21) Appl. No.: 18/296,133

(22) Filed: Apr. 5, 2023

(65) Prior Publication Data

US 2023/0315983 A1 Oct. 5, 2023

Related U.S. Application Data

(60) Provisional application No. 63/327,756, filed on Apr. 5, 2022.

(51) Int. Cl.

| | |
|---|---|
| ***G06F 40/216*** | (2020.01) |
| ***G06F 40/40*** | (2020.01) |
| ***G06N 3/091*** | (2023.01) |

(52) U.S. Cl.

CPC ............ *G06F 40/216* (2020.01); *G06F 40/40* (2020.01); *G06N 3/091* (2023.01)

(58) Field of Classification Search

None

See application file for complete search history.

(56) References Cited

U.S. PATENT DOCUMENTS

| | | | | |
|---|---|---|---|---|
| 9,189,742 | B2 | 11/2015 | London | |
| 10,592,706 | B2 | 3/2020 | Carpenter et al. | |
| 2009/0319269 | A1* | 12/2009 | Aronowitz | G10L 17/00 704/243 |
| 2017/0270095 | A1* | 9/2017 | Ichimura | G06F 40/30 |
| 2017/0278514 | A1* | 9/2017 | Mathias | G06F 16/35 |
| 2021/0125064 | A1* | 4/2021 | Zhao | G06N 3/084 |
| 2022/0222437 | A1* | 7/2022 | Lauber | G10L 15/26 |

FOREIGN PATENT DOCUMENTS

CN 109829036 A 5/2019

OTHER PUBLICATIONS

Mendes et al. “FGNG: A fast multi-dimensional growing neural gas implementation”. Neurocomputing vol. 128, Mar. 27, 2014, pp. 328-340 (Year: 2014).*

Tran et al. “On the Role of Style in Parsing Speech with Neural Models”. arXiv:2010.04288v1 [cs.CL] Oct. 8, 2020 (Year: 2020).*

(Continued)

*Primary Examiner* — Jesse S Pullias

(74) *Attorney, Agent, or Firm* — Own Innovation; James W. Hinton; Caitlin O’Flynn

(57) ABSTRACT

A computer implemented method and associated computer system for dialogue parsing. The method includes receiving dialogue transcript data, pre-processing dialogue transcript data to generate pre-processed dialogue transcript data, providing pre-processed dialogue transcript data as an input to a trained deep growing neural gas neural network; and receiving parsed dialogue transcript data as an output from the trained deep growing neural gas neural network.

14 Claims, 15 Drawing Sheets

(56) References Cited

OTHER PUBLICATIONS

Andreakis et al. "Incremental Unsupervised Time Series Analysis Using Merge Growing Neural Gas". Advances in Self-Organizing Maps, (WSOM 2009) (Year: 2009).*
Jaf et al. "Deep Learning for Natural Language Parsing". IEEE Access, vol. 7, 2019 (Year: 2019).*
Lou et al. "Neural Constituency Parsing of Speech Transcripts". arXiv:1904.08535v4 [cs.CL] Apr. 10, 2020 (Year: 2020).*
Adinogruho et al. "Newsgroup Topic Extraction using Probabilistic Inverse Cluster Frequency Term-Cluster Weighting and Growing Neural Gas Clustering". IAENG International Journal of Computer Science, 48:1, 2021 (Year: 2021).*
Palomo et al. "The Growing Hierarchical Neural Gas Self-Organizing Neural Network". IEEE Transactions On Neural Networks and Learning Systems, vol. 28, No. 9, Sep. 2017 (Year: 2017).*

* cited by examiner

COMPUTER METHOD AND SYSTEM FOR PARSING HUMAN DIALOGUE

TECHNICAL FIELD

The following relates generally to dialogue parsing computer systems and methods, and more particularly to computer systems and methods for parsing human dialogue by collecting dialogue data and providing collected dialogue data to a trained deep growing neural gas machine learning model.

INTRODUCTION

Current dialogue parsing computer systems may accept human voice data that has been transcribed into text data as an input, and output data of interest contained within the human voice data.

However, current dialogue parsing computer systems may not provide natural interaction experiences to human end users. For example, while current dialogue parsing computer systems may be integrated into automated survey or customer service platforms, the end user experience of interacting with such platforms is cumbersome and unnatural, for at least because such platforms rely on dialogue parsing systems that cannot seamlessly extract speech data. Such systems may require end users to use cumbersome or unnatural memorized commands. Additionally, such systems may not accurately parse natural end user speech.

Accordingly, there is a need for an improved computer system and method for parsing human dialogue data that overcomes the disadvantages of existing systems and methods.

SUMMARY

Described herein is a method for dialogue parsing. The method includes receiving dialogue transcript data, pre-processing dialogue transcript data to generate pre-processed dialogue transcript data, providing pre-processed dialogue transcript data as an input to a trained deep growing neural gas neural network and receiving parsed dialogue transcript data as an output from the trained deep growing neural gas neural network.

According to some embodiments, the trained deep growing neural gas neural network is generated by providing object node data to an untrained deep growing neural gas neural network to train the untrained deep growing neural gas neural network.

According to some embodiments, pre-processing dialogue transcript data comprises applying word embeddings to dialogue transcript data to convert words into word embeddings and applying a concept dictionary to the words of dialogue transcript data to associate words of dialogue transcript data to concepts.

According to some embodiments, the method further comprises collecting audio stream data, wherein the audio stream data comprises human dialogue and applying a speech recognition algorithm to audio stream data to generate dialogue transcript data.

According to some embodiments, the audio stream data comprises quick service restaurant order audio.

According to some embodiments, the method further comprises collecting audio stream data, segmenting and diarizing audio stream data, generating sequenced speech data.

According to some embodiments, diarizing audio stream data comprises extracting features of audio stream data, separating audio stream data into data chunks; and providing chunked audio stream data to a trained speech sequencing module.

According to some embodiments, audio stream data comprises quick service restaurant order audio.

According to some embodiments, the trained speech sequencing module is trained is generated by providing speech sequencing training data to an untrained trained speech sequencing module to train the trained speech sequencing module.

According to an embodiment, described herein is a system for dialogue parsing. The system comprises a memory, configured to store dialogue transcript data and a processor, coupled to the memory, configured to execute a dialogue pre-processing module and trained deep-growing neural gas neural network, wherein the processor is configured to receive the dialogue transcript data from the memory, pre-process the dialogue transcript data using the dialogue pre-processing module to generate pre-processed dialogue transcript data, provide the pre-processed dialogue transcript data to the trained deep-growing neural gas neural network as an input, and received parsed dialogue transcript data from the trained deep-growing neural gas neural network as an output.

According to some embodiments, the system further comprises an audio capture device, configured to capture audio stream data, and provide the audio stream data to the memory for storage.

According to some embodiments, the processor further comprises a speech recognition module, configured to receive audio stream data from the memory as an input, generate dialogue transcript data as an output and transmit dialogue transcript data to the memory for storage.

According to some embodiments, the trained deep growing neural gas neural network is generated by providing object node data to an untrained deep growing neural gas neural network to train the untrained deep growing neural gas neural network.

According to some embodiments, pre-processing dialogue transcript data comprises applying word embeddings to dialogue transcript data to convert words into word embeddings and applying a concept dictionary to the words of dialogue transcript data to associate words of dialogue transcript data to concepts.

According to some embodiments, audio stream data comprises quick service restaurant order audio.

According to some embodiments, the system further comprises an audio capture device, configured to capture audio stream data, and provide the audio stream data to the memory for storage.

According to some embodiments, the processor further comprises a diarizing module, configured to receive audio stream data from the memory as an input, generate sequenced speech data as an output and transmit sequenced speech data to the memory for storage.

According to some embodiments, generate sequenced speech data comprises extracting features of audio stream data, separating audio stream data into data chunks and providing chunked audio stream data to a trained speech sequencing module.

According to some embodiments, audio stream data comprises quick service restaurant order audio.

Described herein is an analytics system, the system comprising an analytics server platform, a client device comprising a display and a dialogue parsing device wherein the dialogue parsing device is configured to receive audio stream data, parse the audio stream data to produce a parsed dialogue transcript data and transmit the parsed dialogue transcript data to the analytics server platform, wherein the analytics server platform is configured to receive the parsed dialogue transcript and generate dialogue analytics data, and wherein the client device is configured to receive dialogue analytics data and display the dialogue analytics data on the display.

According to some embodiments, the client device and analytics server platform are the same device.

According to some embodiments, the dialogue parsing device and analytics server platform are the same device.

Described herein is a method for dialogue parsing, according to an embodiment. The method includes receiving dialogue transcript data, pre-processing dialogue transcript data to generate pre-processed dialogue transcript data, providing pre-processed dialogue transcript data as an input to a trained deep growing neural gas neural network, receiving parsed dialogue transcript data as an output from the trained deep growing neural gas neural network, providing parsed dialogue transcript data and business memory data to a large language mode and receiving transcript summarization data as an output from the large language model.

According to some embodiments, transcript summarization data is transmitted to a point-of-sale system to process a transaction described by the dialogue transcript data.

According to some embodiments, transcript summarization data is transmitted to a database for the generation of analytics.

According to some embodiments, the business memory data comprises product stock data.

Other aspects and features will become apparent to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Figure 1:
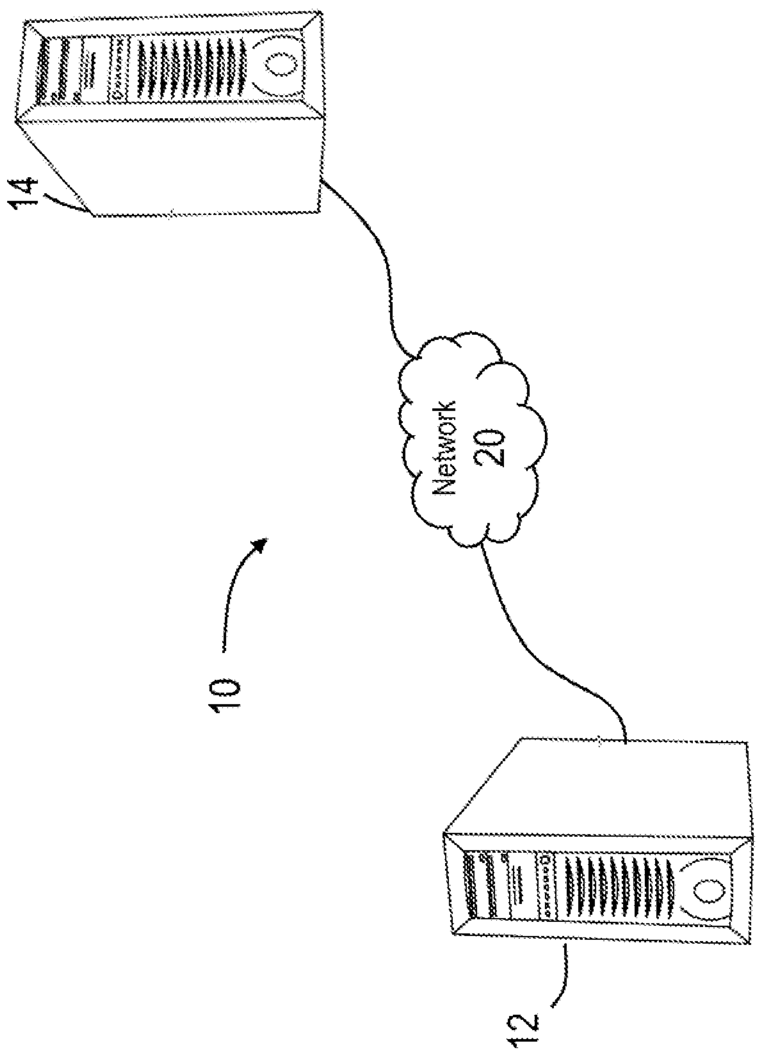
FIG. 1 is a block diagram of a computing device for use in a dialogue parsing system, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud-based program or system, laptop, personal data assistance, cellular telephone, smartphone, or tablet device.

Each program is preferably implemented in a high-level procedural or object-oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary, a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The following relates generally to dialogue parsing computer systems and methods, and more particularly to computer systems and methods for parsing human dialogue by collecting dialogue data and providing collected dialogue data to a trained deep growing neural gas machine learning model.

Typically, humans interact with computer systems using input devices such as keyboards, mice, trackpads, touchscreens, styluses and other input devices. Such input methods require physical interaction from humans, which may be practically limiting in some use cases. Additionally, such input methods may be unnatural and cumbersome, especially for untrained human users.

Some computer systems may additionally receive input from human users through voice or speech recognition systems. Such systems are configured to receive audio data from human speech, convert audio data into text using a number of methods and parse the text transcript of the speech input to determine the intended meaning of the speech input, such that this speech input may be converted into the user's desired computer input command.

Current speech parsing systems are effective in some use cases, however, other use cases of current speech parsing systems require unnatural memorized commands from a user, and do not function effectively when provided with data mimicking natural human speech.

Provided herein are dialogue parsing computer systems and methods which may more accurately parse human speech for certain use cases, such that the human voice instructions are more seamlessly parsed by the computer system, allowing for natural speech interaction with a computer system.

The system and methods described herein are configured to receive text data corresponding to recorded human speech, and intelligently convert this text data to computer commands.

First, a set of tagged training speech data is provided to the system for pre-processing. The system groups each individual words of the tagged data into concepts or context, which are then grouped into objects. Afterwards, contexts, concepts or objects are converted into intents. Subsequently, each word is converted into a node data object, each node data object comprising a left-intent, left-object, left-context, current word, concept, current-object, and right-context. Each word within the node data object is converted to a word embedding, and the training dataset comprising node data objects, with words converted into word embeddings, is provided to a deep growing neural gas machine learning model as a training dataset for training the deep growing neural gas machine learning model.

After the deep growing neural gas machine learning model has been sufficiently trained, dialogue/speech data may be acquired, pre-processed by converting words to word embeddings and grouping words to concepts, and provided to the trained deep growing neural gas machine learning model as an input. The deep growing neural gas machine learning model may output parsed speech, which may be easily processed by machine into computer commands.

The systems and methods described herein may be particularly effective in use cases wherein the number of possible commands provided to the system is relative limited. For example, the systems and methods described herein may be particularly well suited to applications such as quick service restaurant ordering processing, or voice-based customer service.

Referring first to FIG. 1, shown therein is a block diagram illustrating an dialogue parsing system 10, in accordance with an embodiment.

The system 10 includes a dialogue parsing server platform 12 which communicates with a client terminal 14, via a network 20.

The dialogue parsing server platform 12 may be a purpose-built machine designed specifically for parsing dialogue data collected from client terminal 14. The server platform 12 may be configured to control and execute a dialogue parsing operation, as shown in system 100 of FIG. 3 for parsing dialogue collected by client terminal 14 via an audio capture device.

In some examples of system 10, dialogue parsing server platform 12, and client device 14 may comprise a single device.

The server platform 12, and client devices 14 may be a server computer, desktop computer, notebook computer, tablet, PDA, smartphone, or another computing device. The devices 12, 14 may include a connection with the network 20 such as a wired or wireless connection to the Internet. In some cases, the network 20 may include other types of computer or telecommunication networks. The devices 12, 14 may include one or more of a memory, a secondary storage device, a processor, an input device, a display device, and an output device. Memory may include random access memory (RAM) or similar types of memory. Also, memory may store one or more applications for execution by processor. Applications may correspond with software modules comprising computer executable instructions to perform processing for the functions described below. Secondary storage device may include a hard disk drive, floppy disk drive, CD drive, DVD drive, Blu-ray drive, or other types of non-volatile data storage. Processor may execute applications, computer readable instructions or programs. The applications, computer readable instructions or programs may be stored in memory or in secondary storage, or may be received from the Internet or other network 20. Input device may include any device for entering information into device 12, 14. For example, input device may be a keyboard, key pad, cursor-control device, touch-screen, camera, or microphone. Display device may include any type of device for presenting visual information. For example, display device may be a computer monitor, a flat-screen display, a projector or a display panel. Output device may include any type of device for presenting a hard copy of information, such as a printer for example. Output device may also include other types of output devices such as speakers, for example. In some cases, device 12, 14 may include multiple of any one or more of processors, applications, software modules, second storage devices, network connections, input devices, output devices, and display devices.

Although devices 12, 14 are described with various components, one skilled in the art will appreciate that the devices 12, 14 may in some cases contain fewer, additional or different components. In addition, although aspects of an implementation of the devices 12, 14 may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM. The computer-readable media may include instructions for controlling the devices 12, 14 and/or processor to perform a particular method.

In the description that follows, devices such as server platform 12, and client device 14, are described performing certain acts. It will be appreciated that any one or more of these devices may perform an act automatically or in response to an interaction by a user of that device. That is, the user of the device may manipulate one or more input devices (e.g. a touchscreen, a mouse, or a button) causing the device to perform the described act. In many cases, this aspect may not be described below, but it will be understood.

As an example, it is described below that the device 14 may send information to the server platform 12. For example, an operator user using the client device 14 may manipulate one or more input devices (e.g. a mouse and a keyboard) to interact with a user interface displayed on a display of the client device 14. Generally, the device may receive a user interface from the network 20 (e.g. in the form of a webpage). Alternatively, or in addition, a user interface may be stored locally at a device (e.g. a cache of a webpage or a mobile application).

Server platform 12 may be configured to receive a plurality of information, from each of client device 14. Generally, the information may comprise at least audio stream data or dialogue transcript data.

In response to receiving information, the server platform 12 may store the information in storage database. The storage may correspond with secondary storage of the device 12, 14. Generally, the storage database may be any suitable storage device such as a hard disk drive, a solid state drive, a memory card, or a disk (e.g. CD, DVD, or Blu-ray etc.). Also, the storage database may be locally connected with server platform 12. In some cases, storage database may be located remotely from server platform 12 and accessible to server platform 12 across a network for example. In some cases, storage database may comprise one or more storage devices located at a networked cloud storage provider.

Figure 2:
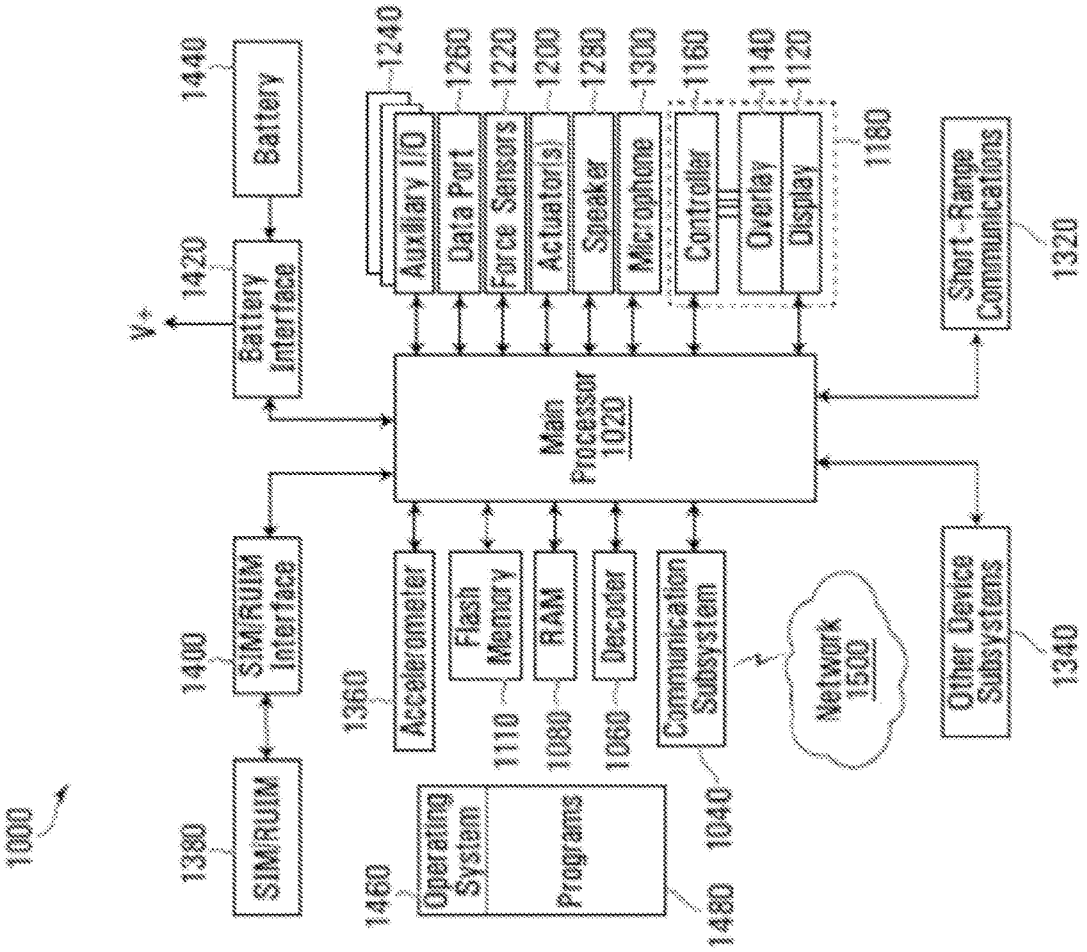
FIG. 2 is a block diagram of a dialogue parsing system, according to an embodiment.

Referring now to FIG. 2, FIG. 2 shows a simplified block diagram of components of a computing device 1000, such as a mobile device or portable electronic device, according to an embodiment. Software modules described in the disclosure herein may be configured to run on a computing device, such as device 1000 of FIG. 2. The device 1000 includes multiple components such as a processor 1020 that controls the operations of the device 1000. Communication functions, including data communications, voice communications, or both may be performed through a communication subsystem 1040. Data received by the device 1000 may be decompressed and decrypted by a decoder 1060. The communication subsystem 1040 may receive messages from and send messages to a wireless network 1500.

The wireless network 1500 may be any type of wireless network, including, but not limited to, data-centric wireless networks, voice-centric wireless networks, and dual-mode networks that support both voice and data communications.

The device 1000 may be a battery-powered device and as shown includes a battery interface 1420 for receiving one or more rechargeable batteries 1440.

The processor 1020 also interacts with additional subsystems such as a Random Access Memory (RAM) 1080, a flash memory 1100, a display 1120 (e.g. with a touch-sensitive overlay 1140 connected to an electronic controller 1160 that together comprise a touch-sensitive display 1180), an actuator assembly 1200, one or more optional force sensors 1220, an auxiliary input/output (I/O) subsystem 1240, a data port 1260, a speaker 1280, a microphone 1300, short-range communications systems 1320 and other device subsystems 1340.

In some embodiments, user-interaction with the graphical user interface may be performed through the touch-sensitive overlay 1140. The processor 1020 may interact with the touch-sensitive overlay 1140 via the electronic controller 1160. Information, such as text, characters, symbols, images, icons, and other items that may be displayed or rendered on a portable electronic device generated by the processor 102 may be displayed on the touch-sensitive display 118.

The processor 1020 may also interact with an accelerometer 1360 as shown in FIG. 2. The accelerometer 1360 may be utilized for detecting direction of gravitational forces or gravity-induced reaction forces.

To identify a subscriber for network access according to the present embodiment, the device 1000 may use a Subscriber Identity Module or a Removable User Identity Module (SIM/RUIM) card 1380 inserted into a SIM/RUIM interface 1400 for communication with a network (such as the wireless network 1500). Alternatively, user identification information may be programmed into the flash memory 1100 or performed using other techniques.

The device 1000 also includes an operating system 1460 and software components 1480 that are executed by the processor 1020 and which may be stored in a persistent data storage device such as the flash memory 1100. Additional applications may be loaded onto the device 1000 through the wireless network 1500, the auxiliary I/O subsystem 1240, the data port 1260, the short-range communications subsystem 1320, or any other suitable device subsystem 1340.

For example, in use, a received signal such as a text message, an e-mail message, web page download, or other data may be processed by the communication subsystem 1040 and input to the processor 1020. The processor 1020 then processes the received signal for output to the display 1120 or alternatively to the auxiliary I/O subsystem 1240. A subscriber may also compose data items, such as e-mail messages, for example, which may be transmitted over the wireless network 1500 through the communication subsystem 1040.

For voice communications, the overall operation of the portable electronic device 1000 may be similar. The speaker 1280 may output audible information converted from electrical signals, and the microphone 1300 may convert audible information into electrical signals for processing.

Figure 3:
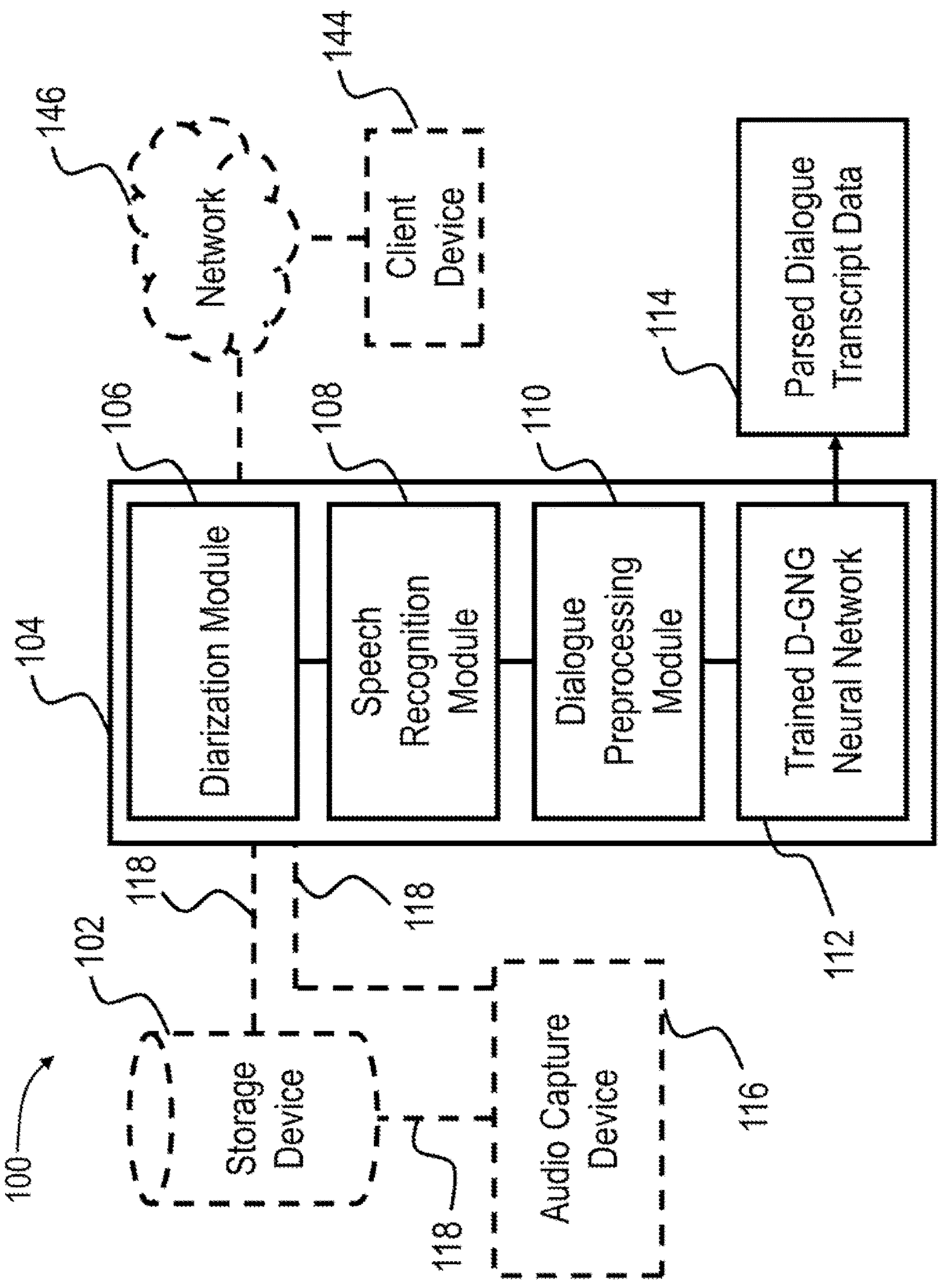
FIG. 3 is a block diagram of a dialogue parsing system, according to an embodiment.

Referring now to FIG. 3, pictured therein is a system block diagram of a dialogue parsing system 100, according to an embodiment.

System 100 may comprise a dialogue parsing module 104, and in some embodiments, an audio capture device 116, storage device 102, client device 144 and network 146. Dialogue parsing module 104 further includes diarization module 106, speech recognition module 108, dialogue preprocessing module 110 and trained deep growing neural gas (D-GNG) model. Dialogue parsing module 104 is configured to output parsed dialogue transcript data 114.

Storage device 102 is configured to store audio stream data 118 for use by other components of system 100. Storage device 102 is coupled to dialogue parsing module 104, such that dialogue parsing module 104 may access the contents of, and write to, storage device 102. Storage device 102 may comprise any form of non-transient computer-readable memory known in the art, for example, without limitation, a hard drive, solid state disk, NAND flash memory, an SD card, or USB flash drive. In some examples, storage device 102 may comprise network accessible cloud storage. The audio stream data 118 stored by storage device may be acquired from any source. The audio stream data 118 may comprise uncompressed pulse code modulation audio data stored in a WAV format file. In other examples, the audio stream data 118 may comprise other compressed or uncompressed audio data formats. The audio stream data 118 comprises an audio recording of at least one human individual speaking.

Audio capture device 116 comprises a physical device configured to capture, transmit and/or store audio stream data 118. Audio capture device 116 may store audio stream data 118 in any format known in the art, including without limitation, pulse code modulated WAV files. Audio capture device 116 may comprise any audio capture device known in the art, and may include, without limitation, a microphone, processor, memory, non-transient computer-readable memory, a network interface and input devices.

Figure 4:
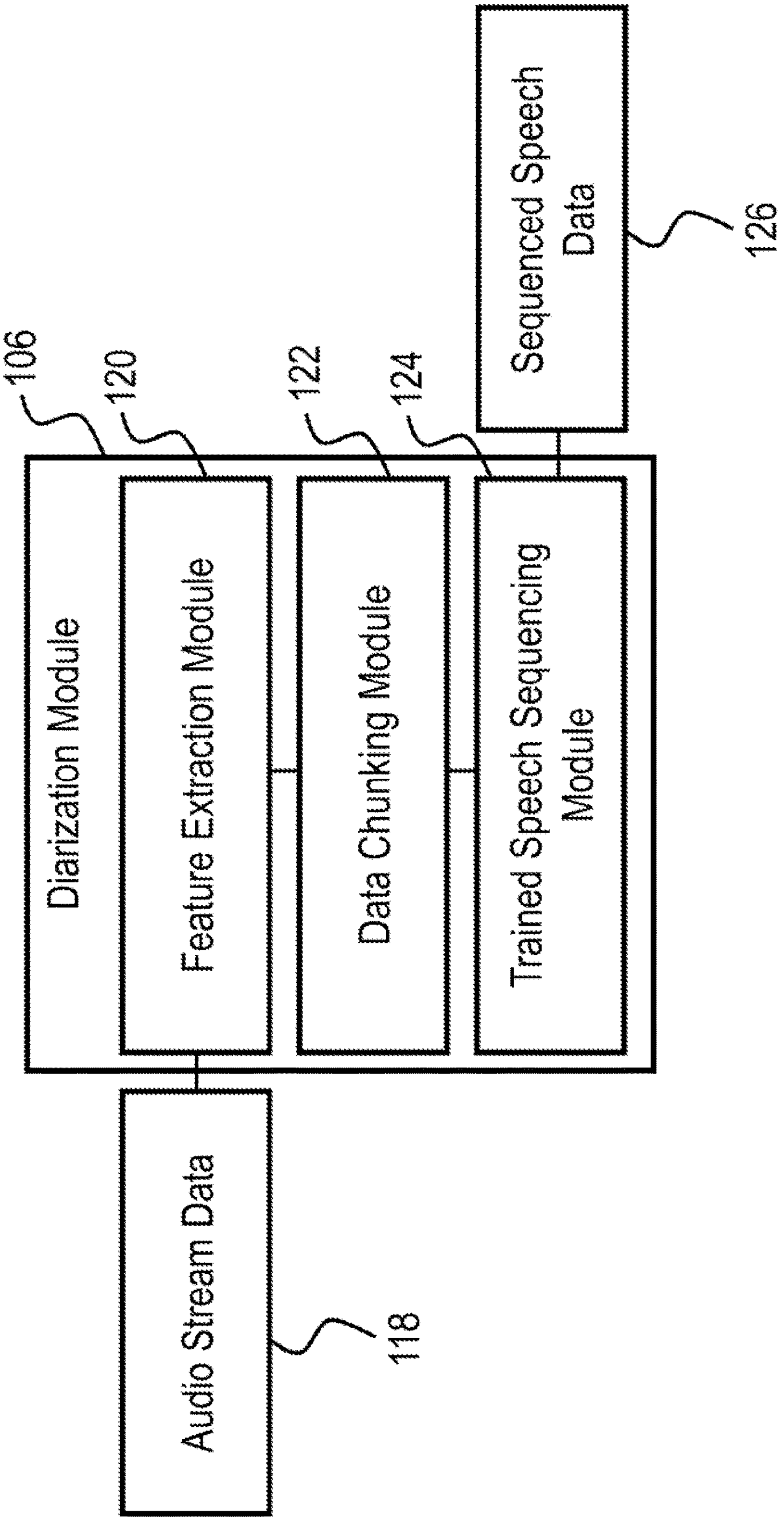
FIG. 4 is a block diagram of the diarization module of the dialogue parsing system of FIG. 2, according to an embodiment.

Referring now to FIG. 4, shown therein is a detailed block diagram of diarization module 106. Diarization module 106 comprises a software module configured to receive audio stream data 118 and output sequenced speech data 126, which may describe points within the audio stream data at which each individual that speaks in the audio stream data 118 is speaking. Diarization module 106 further includes feature extraction module 120, data chunking module 122 and speech sequencing module 124.

Feature extraction module 120 comprises a software module configured to receive audio stream data 118, and output audio stream feature data. For example, audio stream data 118 may comprise pulse-code modulation format digital audio data. Feature extraction module 120 may generate an output such as a mel-frequency cepstrum coefficients or a spectrograph, which may be more easily machine processed to generate insights from the audio data.

Data chunking module 122 is configured to receive audio stream feature data and output chunked audio stream data, wherein audio stream data is separated into discrete portions referred to as chunks. Data chunking module 122 may determine points of abrupt change within the audio stream data to determine where chunk separation points are to be placed. For example, such points of abrupt change may be determined by energy comparison, zero crossing rate, and spectral similarity within the normal range of a phoneme. These points may be selected at chunk separation points.

Once data chunks are generated, chunks may be averaged into equal time length frame chunks, wherein the length of each frame chunk comprises the average time length of all data chunks. For example, if there existed 3 data chunks, with lengths of 1 second, 2 seconds and 3 seconds, the average data chunk time length will be 2 seconds. Each chunk would have its boundaries adjusted such that each chunk comprises the same time length.

Time averaged chunks are then outputted from data chunking module 122 as chunked audio stream data. While the example above describes chunks as comprising timescales measured in seconds, in other embodiments, chunks may comprise much smaller timescales.

Speech sequencing module 124 is configured to receive the chunked audio stream data output from data chunking module 122 and output sequenced speech data 126. Speech sequencing module 124 may comprise a trained machine learning model, configured to receive chunked audio stream data, and compare chunk pairs to determine whether sequential pairs comprise the speech of the same individual speaker, a transition from the speech of one speaker to the speech of another speaker, a transition from background audio to speech audio, or a transition from speech audio to background audio.

In some examples, speech sequencing module 124 may comprise a neural network. In some examples, speech sequencing module 124 may comprise a deep-growing neural gas neural network.

Chunk pairs may be compared sequentially by speech sequencing module 124. For example, chunked audio stream data may comprise 6 chunks. First, chunks 1 and 2 may be compared. Next, chunks 2 and 3 may be compared, and so on, until finally chunks 5 and 6 are compared. The transition from condition of each chunk pair may allow speech sequencing module 124 to determine which speaker (if any) is speaking at any specific time. Speech sequencing module 126 may output sequenced speech data 126.

Sequenced speech data 126 comprises timing information descriptive of when detected speakers begin and end a sequence of speech. For example, an audio stream may comprise a conversation between two human individuals, individual A, and individual B. Audio stream data is inherently timestamped. Sequenced speech data 126 may comprise plaintext timestamp data delineating when individual A is speaking and when individual B is speaking. In other examples, sequenced speech data 126 may comprise clipped audio stream data clips, wherein each clip includes the speech of only a single individual A or B speaking at one time.

Sequenced speech data 126 may be stored in random access memory for immediate use. Sequenced speech data 126 may additionally be stored into a database and a hard-drive or other long-term non-transient computer memory.

Referring back to FIG. 3, speech recognition module 108 comprises a software module configured to receive audio data comprising human speech as an input (e.g. audio stream data 118), and output a dialogue transcript of the inputted audio data. Any speech recognition method or algorithm known in the art may be applied by speech recognition module 108 to convert speech audio data into dialogue transcript data (e.g. dialogue transcript data 148 of FIG. 5), which comprises a text format transcript of the human speech contained within the audio data. By applying data contained within sequenced speech data 126, dialogue transcript data 148 may be separated into the dialogue of each individual speaking in the originally captured audio stream data 118.

In some examples, speech recognition module 108 may comprise a locally executed or cloud based speech to text model, such as OpenAI™ Whisper™, or any other speech to text model known in the art.

Figure 5:
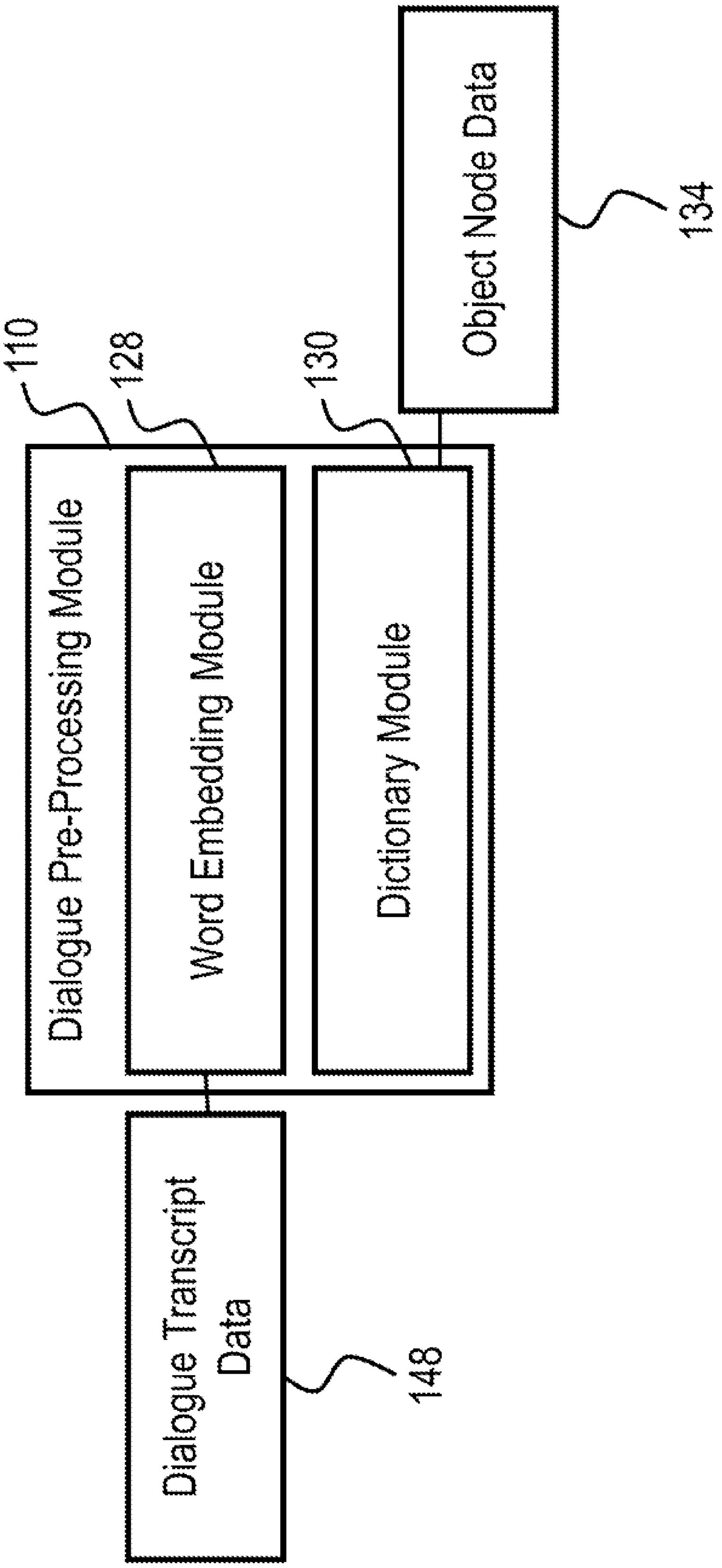
FIG. 5 is a block diagram of the dialogue pre-processing module of the dialogue parsing system of FIGS. 3-4, according to an embodiment.

Referring now to FIG. 5, shown therein is a detailed block diagram of dialogue pre-processing module 110. Dialogue pre-processing module 110 comprises a software module configured to receive dialogue transcript data 148 generated by speech recognition module 108, and sequenced speech data 126 generated by diarization module 106, and output pre-processed dialogue transcript data. Dialogue pre-processing module 110 further includes word embedding module, and dictionary module 130.

Word embedding module 128 is configured to receive the dialogue transcript data from the speech recognition module and convert any or each word of the dialogue transcript data to a word embedding. A word embedding may comprise a multi-dimensional vector, comprising a plurality of numerical values. These numerical values may be used to map each word in a multi-dimensional space. Words closer to one another in this multidimensional space generally correspond to more closely related words. Distance between words may be determined through a Euclidean distance in n-dimensional space calculation. In some examples, each word embedding may comprise three hundred dimensions (e.g. 300 independent numerical values). Word embeddings may enhance the ability of system 100 to parse dialogue comprising previously unseen words, as word embeddings trained on a very large dataset of words may map such words to a space associated with the general meaning of the word.

In some examples, each word embedding may comprise fewer than three hundred dimensions. In some examples, word embedding module 128 may further apply a dimension reduction algorithm to each word embedding, to reduce the computing power required to further process word embeddings and increase compatibility of word embeddings with other software modules, with a tradeoff of reduced word embedding precision.

In some examples, word embeddings may be generated through an application of a pre-trained word embedding machine learning model. For example, in some embodiments, word embeddings may be generated by the application of a Global Vectors for Word Representation model, trained from Common Crawl data comprising 800 billion tokens. In other embodiments, generative pre-trained transformer (GPT) 2 model or other similar models, may be used to generate word embeddings. In other embodiments, other methods of generating word embeddings may be applied.

Dictionary module 130 is a software module configured to receive dialogue transcript data and associate each word with a concept. In general, a concept that may be associated with a word is an abstraction or categorization of each word. For example, the word "coffee" may correspond to a concept such as "beverage" or "drink", while "cream" may correspond to a "beverage modifier" or "drink addition" in one embodiment. Similarly, "hi" may correspond to "greeting" and "um" may correspond to "filler" in one embodiment. dictionary module 130 may associate each word with a concept by the application of a pre-populated dictionary, wherein the dictionary will return associated concepts as an output when a word is provided as an input. The pre-populated dictionary may include multiple concepts for each word. Each concept entry in the dictionary may additionally include a numerical frequency value, which may be used to further assess the probability that a specific concept is the most appropriate concept for a given word.

The pre-populated dictionary may be generated from training data. A plurality of dialogue transcript datasets, for a given use case of system 100 may be provided to a skilled human operator, for manual tagging of the dialogue transcript data 148 to generate dialogue transcript training data. The concepts manually applied by the human operator may be added to a dictionary to generate the pre-populated concept dictionary.

Referring again to FIG. 3, trained deep-growing neural gas (D-GNG) model comprises a trained neural network, configured to receive pre-processed transcript data as an input, and output parsed dialogue transcript data 114.

The trained deep-growing neural gas (D-GNG) model may comprise a variant of a growing neural gas neural network. Growing neural gas algorithms are known machine learning algorithms, employed for topology learning and dividing data into natural clusters. The deep-growing neural gas neural network is a neural gas algorithm extended into a deep neural net.

A neural gas algorithm, with a sufficiently large dataset "D", with size "N", may be extended to a deep neural network with the following steps: First, dataset D may be converted to a subset "S" of a more manageable size. Second, the subset "S" may be arranged into a layered topology, comprising "L" layers, resulting in a deep-neural gas structure.

A deep-growing neural gas network may then be generated as follows. First, a subset of a dataset, is generated, as described above. Next, a layered topology of the dataset is generated, such that the growing neural gas network may comprise a plurality of layers. Once the layered topology is generated, the deep growing neural gas network is ready to receive training data.

Parsed dialogue transcript data 114 comprises dialogue transcript data, further including intent data. Intent data comprises data linking a portion of dialogue into a general meaning or higher abstraction. An intent comprises a level of abstraction over a concept, as applied by dictionary module 130. For example, an intent that may be applied to a portion of dialogue of dialogue transcript data 148 related to a quick service restaurant order may be "order", "greeting" or "end of order". An intent that may be applied to a portion of dialogue of dialogue transcript data 148 related to a telephone survey may be "greeting" or "respondent submission".

Parsed dialogue transcript data 114 is structured such that it may be readily further machine processed. For example, intent labels within parsed dialogue transcript data 114 may be provided in a separate file that may be more conveniently provided to another computing device for further processing.

In operation of system 100, audio stream data 118 is copied onto storage device 102, or alternatively, generated by audio capture device 116 and stored onto storage device 102. Audio stream data 118 may be passed to dialogue parsing module 104 as an input from storage device 102.

In other examples, audio stream data 118 may be captured by audio capture device 116, and directly provided to dialogue parsing module 104.

Once audio stream data 118 is received by dialogue parsing module 104, audio stream data 118 may be provided to both diarization module 106 and speech recognition module 108. Diarization module 106 may output speech timing data corresponding to each speaker participating in the dialogue comprising audio stream data 118, as well as timing data corresponding to "background sound", or a condition wherein no speaker is speaking at the current instant, as sequenced speech data 126. Speech recognition module 108 may output dialogue transcript data 148.

Sequenced speech data 126 and dialogue transcript data 148 may both be provided to dialogue pre-processing module 110, for pre-processing this data into a format that may be accepted by trained D-GNG neural network 112 for dialogue parsing. Once data has been pre-processed by pre-processing module 110, data may be provided to trained D-GNG neural network 112 for dialogue parsing.

D-GNG neural network 112 is configured to receive input data, and output parsed dialogue transcript data 114. Parsed dialogue transcript data 114 may be transmitted to another software module or computing device for further processing. For example, Parsed dialogue transcript data 114 may be processed to extract customer restaurant order commands from the recorded dialogue, and these commands may be passed to a restaurant order taking terminal.

In a specific example, the following drive-through dialogue transcript may be provided for parsing: "S: my pleasure to serve you. G: hi can i get a large double double. S: a large double double sure. Is that everything today. G: and can i have an everything bagel toasted with cream cheese. S: would you like to make a combo with potato wedges. G: no thanks. S: drive up please", wherein "S" portions refer to server dialogue, and "G" portions refer to guest dialogue.

This provided dialogue transcript may be pre-processed for parsing into the following structure: "S: (my pleasure to serve you) [vectors] #greet G: (hi) [vectors] #greet (can i get) [vectors] #order (a) [vectors] #quantity (large) [vectors] #size (double double) [vectors] #drink. S: (a) [vectors] #quantity (large) [vectors] #size (double double) [vectors] #drink (sure) [vectors] #confirm. (Is that everything) [vectors] #confirm-finish. G: (and can i have) [vectors] #order (an) [vectors] #quantity (everything bagel) [vectors] #baked-goods (toasted with cream cheese) [vectors] #baked-goods-modifier. S: (would you like to) [vectors] #suggest (make a combo) [vectors] #combo (with) [vectors] #prep (potato wedges) #baked-goods. G: (no thanks) [vectors] #deny. S: (drive up) [vectors] #drive-up please." The above structure includes associated classes, each appended with "#", as well as "[vectors]" symbols, to indicate that words within the dialogue transcript data may be converted into word embeddings during processing.

The above is a simplified example without concept ambiguities. In real world applications, the concept dictionary may include words with multiple concepts, depending on context. For example, "double double" can refer to a coffee drink itself, or can refer to the modifier of a coffee or tea, etc. During pre-processing, the words may carry concept ambiguities which will be removed during parsing by the D-GNG neural network 112.

The resulting output from the D-GNG neural network 112 may be as follows:

"S: (my pleasure to serve you) [vectors] #greet !grt G: (hi) [vectors] #greet (can i get) [vectors] #order ((a) [vectors] #quantity (large) [vectors] #size (double double) [vectors] @drink) !ord. S: ((a) [vectors] #quantity (large) [vectors] #size (double double) [vectors] @drink) (sure) [vectors] #confirm !cfm. (Is that everything) [vectors] #confirm-finish !fin. G: (and can i have) [vectors] #order ((an) [vectors] #quantity (everything bagel) [vectors] #baked-goods (toasted with cream cheese) [vectors] #baked-goods-modifier @baked-goods) !ord. S: (would you like to make) [vectors] #suggest ((a combo) [vectors]#combo (with) [vectors] #prep (potato wedges) #baked-goods @combo) !sgt. G: (no thanks) [vectors] #deny !dny. S: (drive up) [vectors] #drive-up please !drv".

The output sample above includes associated intents, each appended with "!". Intents in this embodiment may refer to greetings (!grt), orders (!ord), suggestions (!sgt), an order finish command (!fin), or a drive up command (!drv). In other embodiments, more, fewer, or different intent tags may be applied.

Once intents have been applied, the dialogue has been parsed, and may be easily machine read for further use, such as for conversion into order commands for transmission to an order terminal.

The example above comprises a simplified post-processing and parsing example. The above example does not depict the conversion of individual words into object node structure, such that each individual word is associated with at least one concept, as well as word and concept context data.

In some examples of system 100, audio stream data may be provided to dialogue parsing module 104 through a network 146. For example, a client device 144 may be coupled to dialogue parsing module 104 through network 146 as shown in FIG. 3.

Network 146 may comprise any electronic computer network known in the art. For example, network 146 may comprise a local area network, wide area network, other private network, or a public network such as the Internet.

Client device 144 may be any computing device known in the art that may capture and/or transmit audio stream data 118. In some examples, client device 144 may further comprise an audio capture device, analogous to audio capture device 116. Client device 144 may capture audio stream data 118, and transmit audio stream data 118 to dialogue parsing module 104 for processing. Dialogue parsing module 104 may process received audio stream data 118, generate parsed dialogue transcript data 114 and transmit parsed dialogue transcript data 114 back to client device 144 over network 146 for further use.

Figure 6:
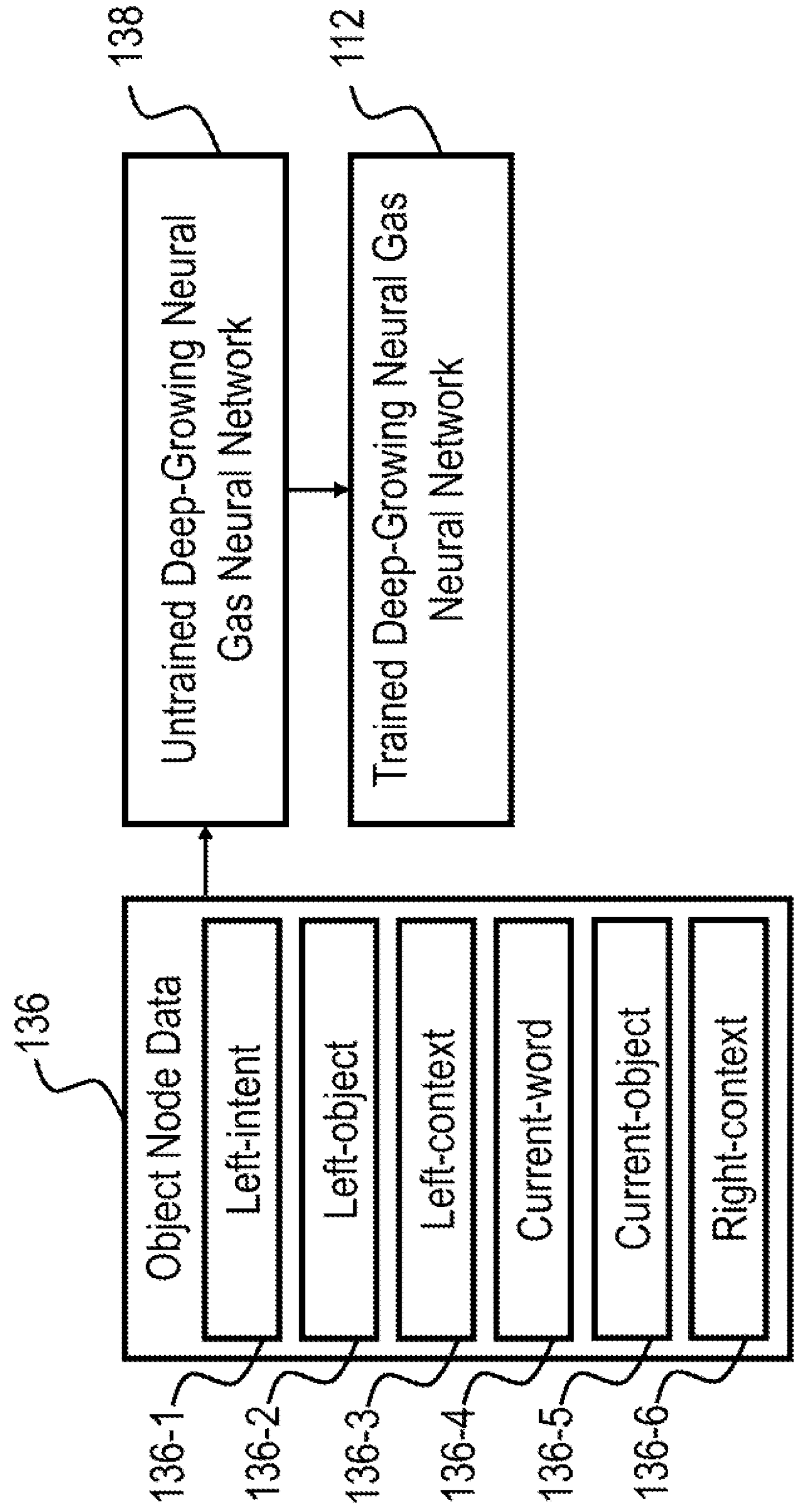
FIG. 6 is a block diagram describing the training process of the deep-growing neural gas neural network of the dialogue parsing system of FIGS. 3-5, according to an embodiment.

Referring now to FIG. 6, pictured therein is a block diagram describing the training process of the D-GNG neural network. Object node data 136 is provided to the untrained D-GNG neural network 138, such that a trained D-GNG neural network 112 is produced. Object node data 136 comprises particularly structured, and manually tagged dialogue transcript data. Such dialogue transcript data is collected for the specific use case of which the system is to be applied. The dialogue transcript data is then manually tagged by a skilled human operator.

The object node form of the object node data 136 is a structure of words, objects, intents and contexts, with all words expressed as word embeddings. A single object node may be generated for each word in the dialogue transcript data. An object node may have the following structure: left-intent 136-1, left-object 136-2, left-context 136-3, current-word 136-4, current-object 136-5, right-context 136-6.

Context refers to the words immediately to the left and right of the current word that is the subject of the object node. Each context 136-3, 136-6 comprises up to 8 words in some examples. If no context words are available, context entries 136-3, 136-6 may be left blank. In some examples, context words may be weighted by proximity to the current-word 136-4. For example, words nearer to current-word 136-4 will be assigned a greater weight, such that the content of the context word contributes more to the dialogue parsing process than more distant context words.

Intent refers to intent as previously described above. Intent data comprises data linking a portion of dialogue into a general meaning or higher abstraction. An intent comprises a level of abstraction over a concept. Intents may be manually applied to each word or phrase when relevant by a skilled human operated tasked with tagging collected dialogue transcript data for the training of the D-GNG neural network 112.

Object refers to the concept or concepts assigned to each word, as described above in reference to dictionary module 130. Each word may be assigned a concept if relevant and present within pre-populated concept dictionary.

Once this object node structure is assembled for each word from manually tagged transcript data, object node data 136 is provided for the training of untrained D-GNG neural network 138. The D-GNG neural network 138 is then trained, producing a trained D-GNG neural network 112, which may be applied as described above to parse dialogue transcript data.

Figure 7:
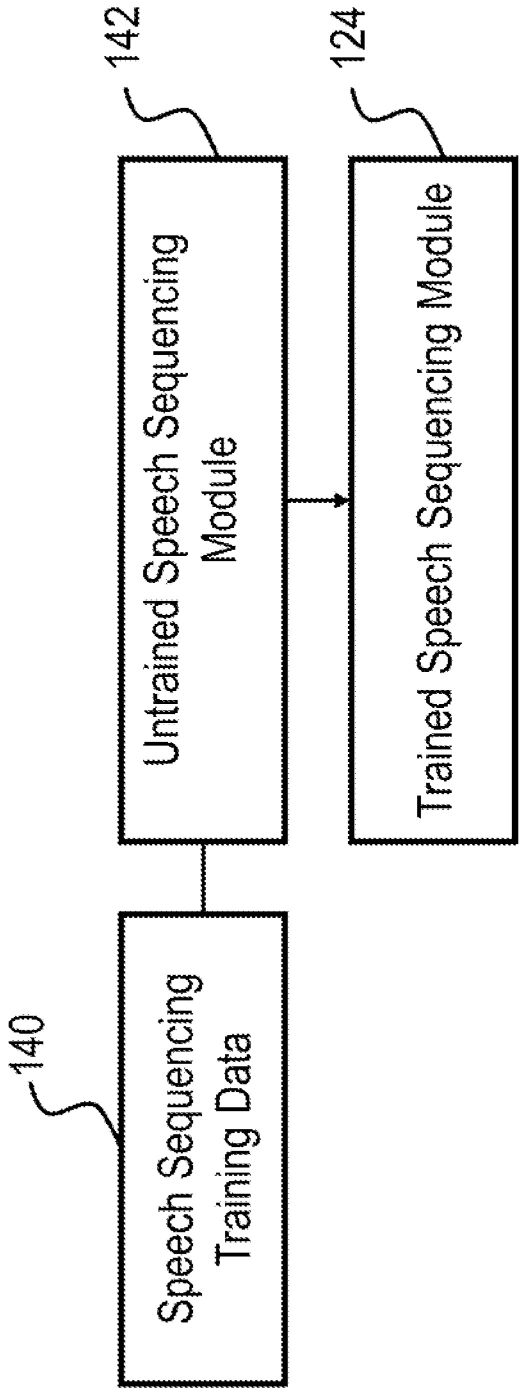
FIG. 7 is a block diagram describing the training process of the speech sequencing module of the dialogue parsing system of FIGS. 3-6, according to an embodiment.

Referring now to FIG. 7, pictured therein is a block diagram describing the training process of the speech sequencing module 124. Speech sequencing training data 140 is provided to untrained speech sequencing module 142. Speech sequencing training data 140 may comprise a paired set of audio stream data of a conversation, and timestamp data corresponding the sequences of speech of each speaker speaking in the audio stream data. Such corresponding timestamp data may be manually generated by a skilled human operator, for the purpose of training speech sequencing module 124. Preferably, speech sequencing training data 140 comprises data similar to that expected by the system 100 during deployment. For example, if system 100 is to be deployed in a political survey application, speech sequencing training data 140 preferably comprises political survey dialogue data.

Speech sequencing training data 140 may be specifically structured and pre-processed for the training of untrained speech sequencing module 142. In one example, the audio data of speech sequencing training data 140 may be first processed to generate frame-level mel-frequency cepstrum coefficients (MFCC). Each frame may comprise a 25 millisecond duration and 10 millisecond step size. Next, each frame may be concatenated into base segments of 10 frames, each base segment comprising 390 dimensional vectors. Next, each dimension may be normalized to the range of (−1,+1). Next, the total processed dataset is inputted into a subset generation algorithm, generating a subset of data clusters representative of the total dataset. Lastly, this subset of data clusters may be ultimately provided to untrained speech sequencing module 140 for the training of a machine learning model of untrained speech sequencing module 140. The dataset of these normalized vectors may then be reduced into a subcluster of a size smaller than the original dataset, then provided to the untrained speech sequencing module 142 for training.

Once untrained speech sequencing module 142 receives speech sequencing training data 140, speech sequencing module may be trained by analyzing speech sequencing training data 140, producing a trained speech sequencing module 124. Trained speech sequencing module 124 may now receive chunked audio stream data for the generation of sequenced speech data 126, as described above in reference to FIG. 4.

Figure 8:
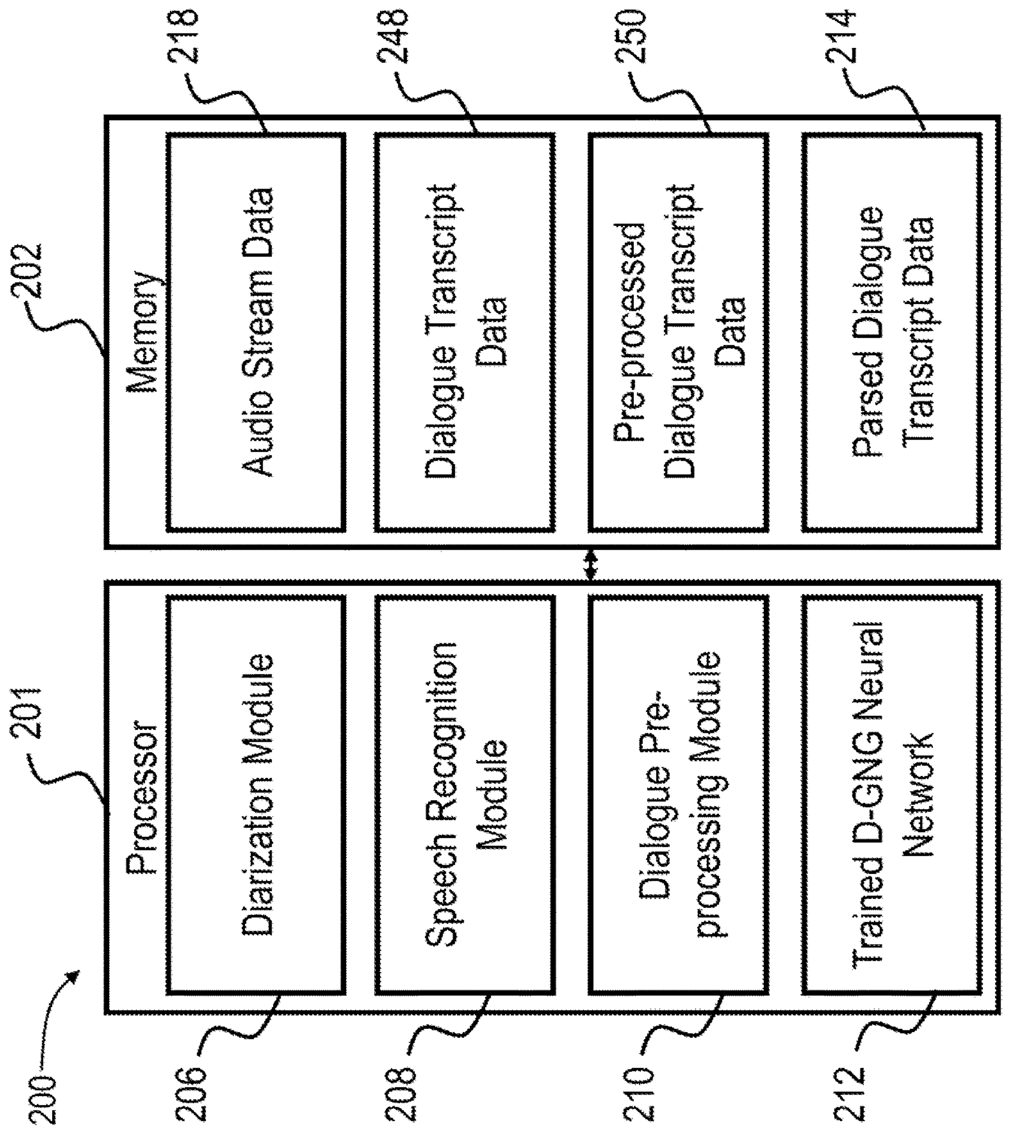
FIG. 8 is a block diagram of a dialogue parsing system, according to an embodiment.

Referring now to FIG. 8, pictured therein is a block diagram depicting a dialogue parsing system 200 comprising processor 201 and memory 202, wherein processor 201 and memory 202 further comprise a plurality of software modules and data respectively. Description above in reference to system 100 may apply to system 200. Reference characters of software modules and data may correspond to reference characters of system 100 incremented by 100.

Processor 201 further comprises diarization module 206, speech recognition module 208, dialogue pre-processing module 210 and trained D-GNG neural network 212. Memory 202 further comprises audio stream data 218, dialogue transcript data 244, pre-processed dialogue transcript data 248 and parsed dialogue transcript data 214. Processor 201 and memory 202 are configured such that data may be passed between processor 201 and memory 202. For example, audio stream data 218 may be passed from memory 202 to processor, and provided to speech recognition module 208. Speech recognition module may process audio stream data 218 to generate dialogue transcript data 248. Dialogue transcript data 248 may then be passed from processor 201 to memory 202 for storage.

Figure 9:
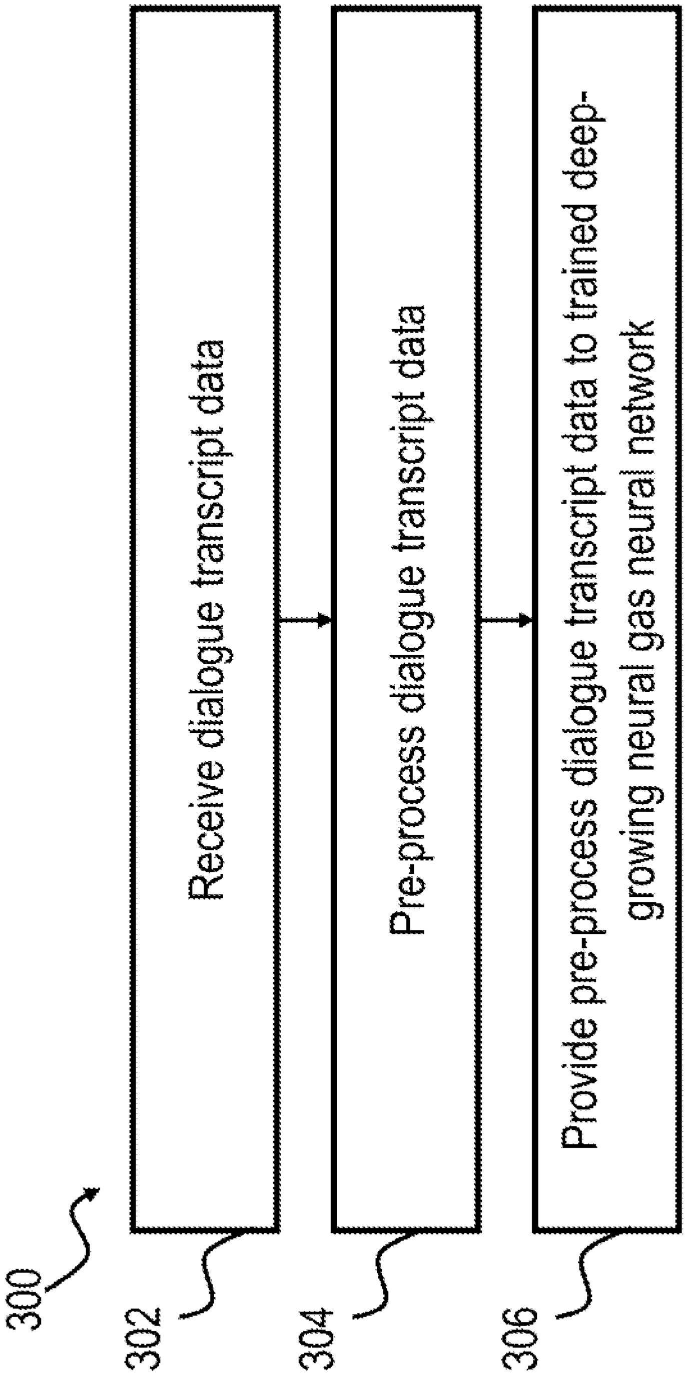
FIG. 9 is a flow chart of a computer implemented method of dialogue parsing, according to an embodiment.

Referring now to FIG. 9, pictured therein is a flowchart depicting a computer-implemented method 300 of dialogue parsing, according to an embodiment. Method 300 comprises 302, 304 and 306. Description above in reference to systems 100 and 200 above may apply to method 300.

At 302, dialogue transcript data is received.

At 304, dialogue transcript data is pre-processed.

At 306, pre-processed dialogue transcript data is provided to a trained deep-growing neural gas neural network.

Figure 10:
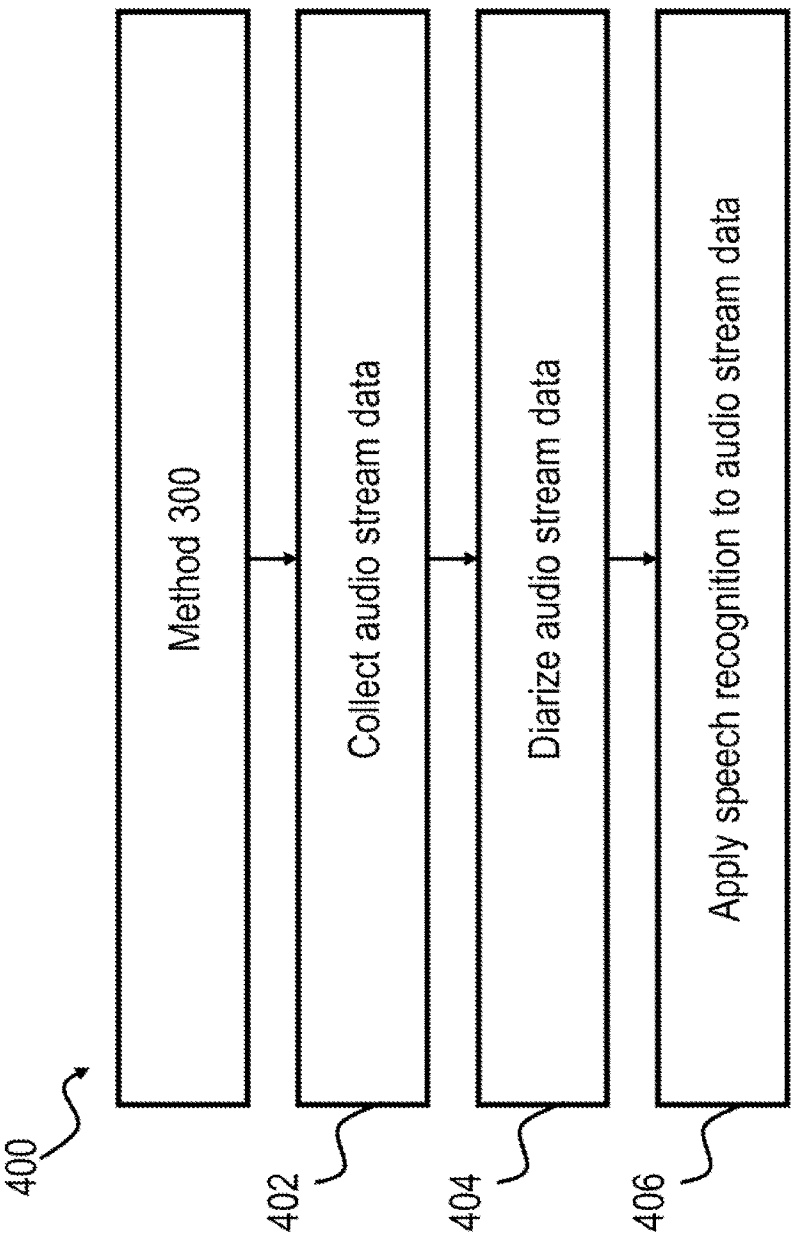
FIG. 10 is a flow chart of a computer implemented method of dialogue parsing, according to another embodiment.

Referring now to FIG. 10, pictured therein is a flowchart depicting a computer-implemented method 400 of dialogue parsing, according to an embodiment. Method 400 comprises any or all portions of Method 300, as well as 402, 404 and 406. Description above in reference to systems 100 and 200, and method 300 above may apply to method 400.

At 402, audio stream data is collected.

At 404, audio stream data is diarized.

At 406, speech recognition is applied to audio stream data.

Figure 11:
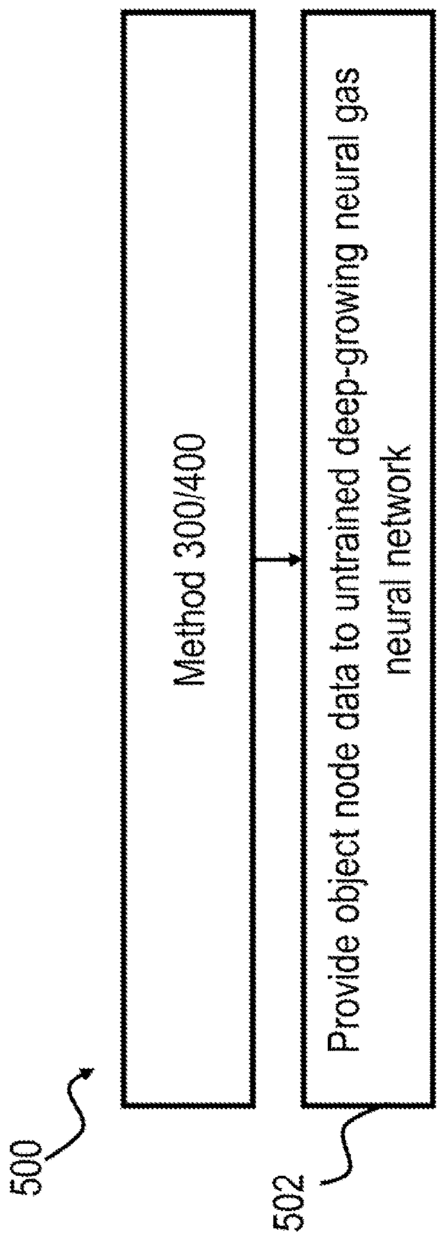
FIG. 11 is a flow chart of a computer implemented method of dialogue parsing, according to another embodiment.

Referring now to FIG. 11, pictured therein is a flowchart depicting a computer-implemented method 500 of dialogue parsing, according to an embodiment. Method 500 comprises any or all portions of Methods 300 and 400, as well as 502. Description above in reference to systems 100 and 200, and methods 300 and 400 above may apply to method 500.

At 502, object node data to is provided to the untrained deep-growing neural gas neural network.

Figure 12:
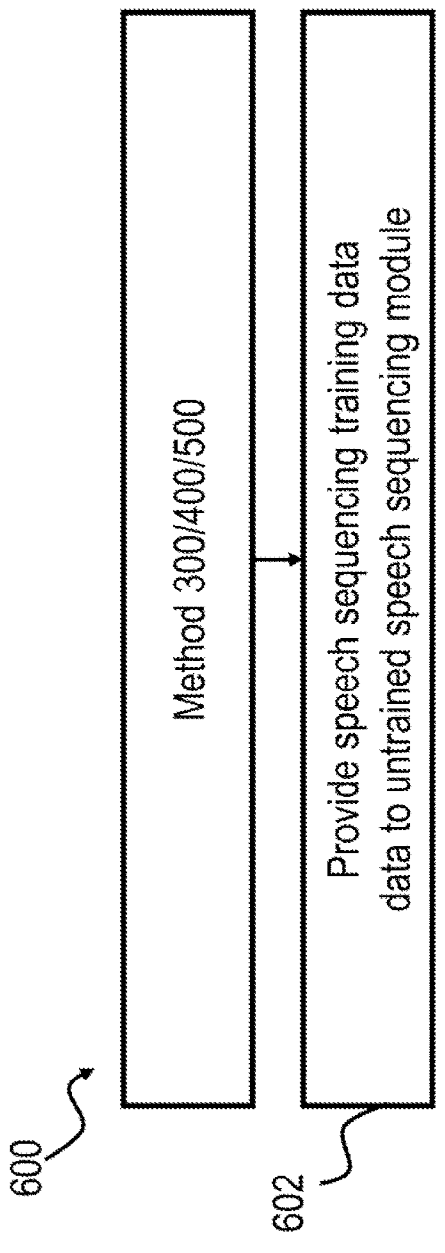
FIG. 12 is a flow chart of a computer implemented method of dialogue parsing, according to another embodiment.

Referring now to FIG. 12, pictured therein is a flowchart depicting a computer-implemented method 600 of dialogue parsing, according to an embodiment. Method 600 comprises any or all portions of Methods 300, 400 and 500, as well as 602. Description above in reference to systems 100 and 200, and methods 300, 400 and 500 above may apply to method 600.

At 602, speech sequencing training data is provided to the untrained speech sequencing module.

The systems and methods described herein may be particularly well suited for quick service restaurant applications, survey applications, and or customer service/call center applications. These applications may be particularly well suited for the systems and methods described herein as there is a limited range of "expected" dialogue in such applications. For example, in a survey application, it may be known that respondents may provide a response indicating a preference for one of five possible political candidates. Such limited paths may be well captured, and concepts may be well described in the pre-populated dictionary and training datasets for such applications. Similarly, when applied to a quick service restaurant ordering system, there are a fixed and known number of possible restaurant orders and modifications, as well as a limited number of expected administrative commands. Such limitations may result in particularly high accuracy when applying the systems and methods described herein.

While the systems and methods described herein may be particularly well suited to certain applications as described above, some embodiments of the systems and methods described herein may be applied to a general use dialogue parsing system. For example, including large language models in the systems and methods described herein may be well adapted for general use dialogue parsing.

The systems and methods described herein may be applied at various levels of automation. At one level, the systems and methods described herein may be used to collect data and generate statistics and or analytics for currently proceeding dialogue. For example, the system may be positioned such that speech between two individuals (e.g. a customer and customer service representative) is captured and subsequently parsed. The two individuals may conduct their conversation as normal, while the system captures and parses their conversation. This parsed conversation may be recorded, and may be used to collect conversation statistics. These conversation statistics may comprise commercially valuable insights, including customer desire data, common employee errors, characterizations of employee performance and more.

At another level, the systems and methods described herein may be used to partially automate a conversation or dialogue-based task. For example, a use case may include an individual providing an order to a quick service restaurant, the system and methods described herein may automatically parse an individual's natural, verbal order with high accuracy. Additionally, the system may further include text-to-speech technology to enable a two-way virtual conversation with the individual, mimicking a human interaction. The parsed order may be readily converted into order commands for input into an ordering terminal or point of sale. This data may be reviewed by a remote human reviewer or administrator for accuracy. In other examples, this ordering process may be overseen by a remote human reviewer or administrator, such that the remote human reviewer or administrator may "take over" the ordering operation from the automated system in situations wherein the system does not effectively parse an individual's order.

At another level of automation, the systems and methods described herein may be used to fully automate a conversation or dialogue-based task. For example, a use case may include an individual providing an order to a quick service restaurant, the system and methods described herein may automatically parse an individual's natural, verbal order with high accuracy. Additionally, the system may further include text-to-speech technology to enable a two-way virtual conversation with the individual, mimicking a human interaction. This system may be fully automated, such that no manual human intervention is required, as the system may parse the individuals verbal order with extremely high accuracy.

The systems and methods described herein may be particularly well suited for quick service restaurants. The typical conversation between an order taking employee at a quick service restaurant and a customer is very limited. The vast majority of customers are verbally requesting a small number of items and item variations. The systems and methods described herein, if trained with relevant training datasets in some examples, may very accurately parse such customer data. Advantageously, the systems and methods described herein may accurately parse natural customer speech, as the system is trained to expect natural human dialogue and the natural variations thereof.

In some examples, the systems and methods described herein may be integrated into a legacy system. For example, in a quick service restaurant analytics application, the systems and methods described herein may be integrated into existing hardware and software systems existing in the quick service restaurant.

In a specific example, a quick service restaurant may provide a drive through service option. The drive through in operation may generally receive a customer operating a motor vehicle. The motor vehicle operator may align the driver's side window of the vehicle with an ordering window or terminal on the physical quick service restaurant structure.

Once aligned, the motor vehicle operator (customer) may request an order through the microphonic system, wherein the speech of the customer is captured by a microphone and transmitted to a speaker, earpiece or headset within the quick service restaurant structure. The quick service restaurant employee processing the order may receive the customer's speech through the speaker, earpiece or headset from within the quick service restaurant. Similarly, the employee may speak into a microphone, which may capture their speech, and relay their speech to the exterior terminal, such that customer may hear their speech, such that the customer and employee may carry on a conversation or dialogue through the microphonics system. During the conversation, the employee may enter customer order information into an order terminal, and may provide the customer with instructions and information through the microphonics system.

The systems and methods described herein may be applied such that audio signals from the quick service restaurant microphonic system are captured, converted into audio stream data, and provided to the systems and methods as described above. To achieve such integration, a physical computer device (e.g. server platform 12 of system 10) may be installed into the quick service restaurant, and configured such that audio streams of the microphonics system may be captured and processed. Additionally, the physical computer device may be connected to a network, such that captured, parsed and processed data may be transmitted from the physical computer device to a server for further use and processing. Alternatively, the physical computer device may be coupled to the microphonics system such that the audio streams of the system may be captured and transmitted over a network to a server for processing (e.g. parsing). In some examples, the physical computer device may be a Raspberry Pi 4, or a mini-PC utilizing an x86 or ARM architecture.

As customers and employees interact through the microphonics system, the system described herein may parse dialogue within captured audio streams, and calculate analytics on the parsed dialogue. For example, order information and timing may be captured. This order information and timing data may be compared to order information and timing data of the order terminal utilized by the employee, in order to determine an employee error rate. In some examples, analytics of parsed dialogue may be generated or calculated by an analytics server platform.

In another embodiment of the systems and methods described herein, the system may be integrated as described in the analytics example above, however, the system may be further integrated into the order terminal of the quick service restaurant. In such an implementation, employee intervention may not be required for a customer to complete an order. The customer may verbally provide their order to the microphonics system, which may pass an audio stream to the physical computer device. The physical computer device may parse the dialogue within the received audio stream locally, or through a network connected server. Once the dialogue has been parsed, the physical computer device may transmit associated order commands to the order terminal, such that the order may be received by the restaurant and executed. In some examples, such an integration may further include a customer readable display for confirming order contents, as well as a text to speech system, such that the system may provide for two way communication between the system and customer.

Figure 13:
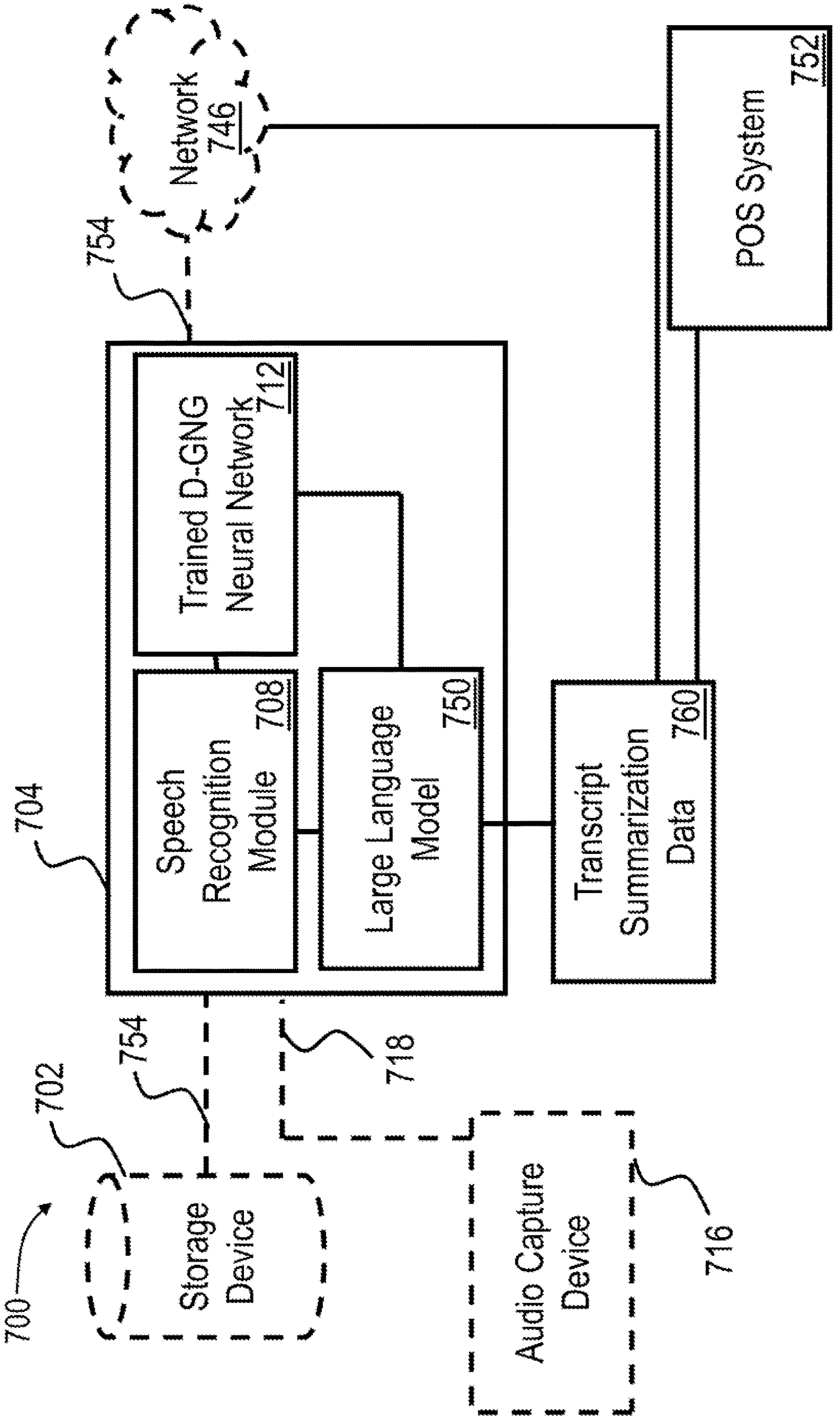
FIG. 13 is a block diagram of a dialogue parsing system, according to another embodiment.
Figure 14:
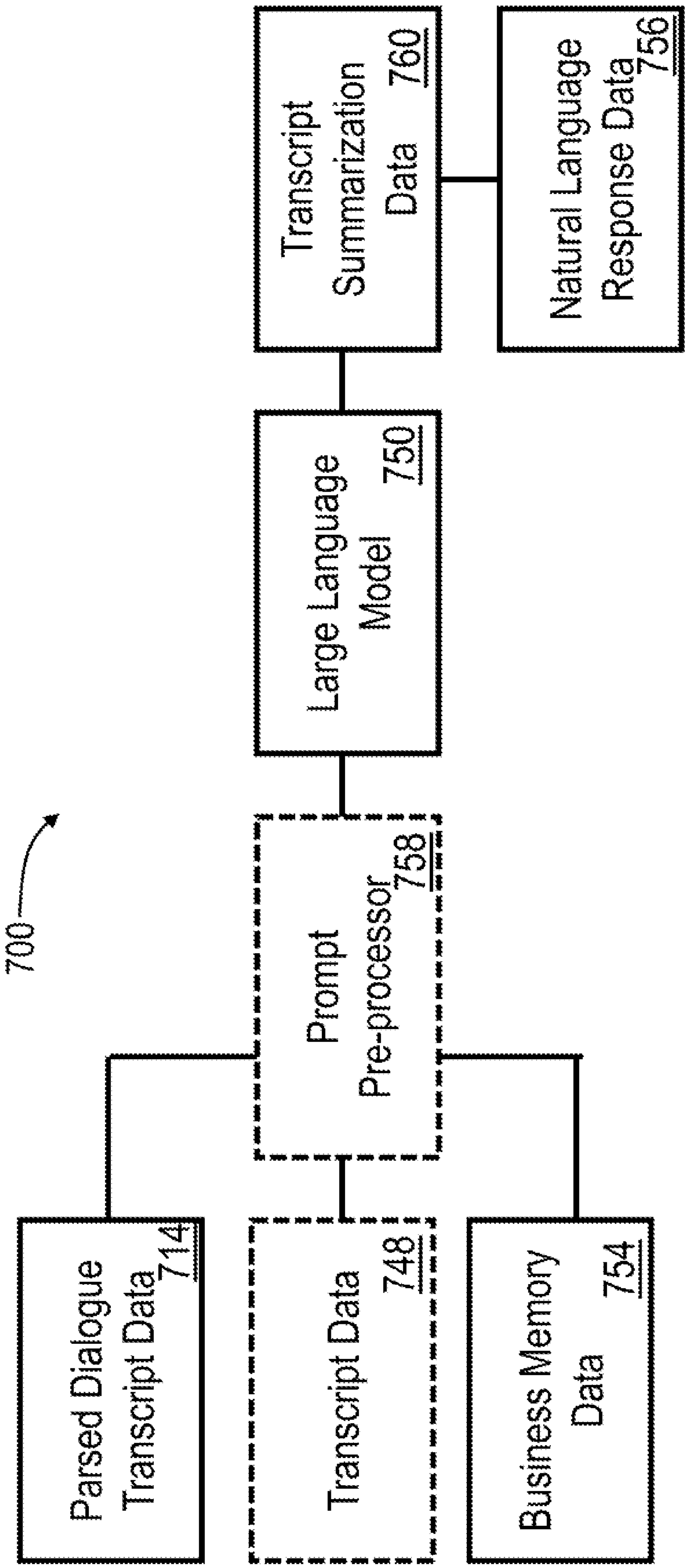
FIG. 14 is a detail block diagram of the dialogue parsing system of FIG. 13.

Referring now to FIGS. 13 and 14, shown therein is a system block diagram of a dialogue parsing system 700, according to an embodiment. System 700 includes speech recognition module 708, trained D-GNG Neural Network 712, large language model 750, transcript summarization data 714 and optionally, storage device 702, network 746, POS system 752, and audio capture device 716. Components of system 700 may be analogous to components of system 100, incremented by 600 each.

Trained D-GNG Neural Network 712 comprises a software module configured to receive dialogue transcript input data 748, and output parsed dialogue transcript data. Parsed dialogue transcript data 114 may be transmitted to another software module or computing device for further processing. For example, parsed dialogue transcript data 714 may be processed to extract customer restaurant order commands from the recorded dialogue, and these commands may be passed to a restaurant order taking terminal (e.g. POS system 752).

Large language model 750 comprises a software module which may receive text as an input, and generate a corresponding output according to the training and configuration of the large language model 750. Large language model 750 may comprise a pre-trained general purpose large language model, such as GPT 3, ChatGPT or GPT 4 developed by OpenAI™, or may comprise a large language model specifically configured for the use case of system 700 (e.g. quick service restaurant order taking interactions). In some examples, large language model 750 may be accessed directly and may be executed on local hardware. In other examples, the large language model 750 may be accessed via an application program interface to a cloud hosted language model (e.g. through network 746).

In operation, system 700 may capture audio data 718 using audio capture device 716. Data 718 may be passed to speech recognition module 708 to perform a speech to text operation, to convert data 718 into transcript data 748 for further processing and analysis.

Transcript data 718 may be provided to D-GNG network 712 and/or large language model 750. D-GNG network 712 may process transcript data, as described previously herein, to extract concepts from transcript data 748. Once processing is complete, D-GNG network 712 may provide the corresponding output as an input to large language model 750. In some examples, the output of D-GNG network 712 may be further pre-processed to for provision to large language model 750.

Large language model 750 may be provided with transcript data 748 and business memory data 754, as well as the output of D-GNG network 712 (parse dialogue transcript data 714) as inputs. Inputs into large language model 750 may be combined, adjusted or otherwise processed into a format amendable to the specific large language model 750. In some examples, this input processing may comprise providing natural language style context or explanation as to the function of the business memory data 754, transcript data, or other data. In some examples, the output of D-GNG network 712 (which may be executed locally) provides guiding information to large language model 750, in the form of prompts, such that the large language model 750 (which may be a general-purpose language model in some examples) receives guiding prompts required to carry out the desired functionality of system 700. For example, the output of D-GNG network 712 may generate prompts for provision to large language model 750 detailing which products are to be promoted, which products are unavailable currently, and demographic specific product offerings.

Business memory data 754 may comprise proprietary and/or specific data relating to the implementation of system 700. For example, when system 700 is applied to automating customer interactions at a quick service restaurant, business memory data 754 may comprise menu information, menu hours, store hours, stock data, preparation time data, promotional data and prompts and other information which may be specific to the restaurant in which system 700 is applied. Business memory data 754 may be static (e.g. comprising a fixed menu), or dynamic (e.g. comprising a changing menu, with prices and items that vary over time, updated over a network). In some examples, business memory data 754 may be stored locally, for example, on storage device 702. In other examples, business memory data 754 may be integrated directly into large language model 750. In other examples, business memory data 754 may be stored in a cloud or remote location, and accessed by system 700 through a network (e.g. network 754).

Large language model 750 may generate an output (e.g. transcript summarization data 760) corresponding to the inputs provided to large language model 750. In some examples, this output may comprise a summary of the order in a standardized or machine-readable format. In some examples, the transcript summarization data 760 may further include natural language response data 756.

Referring specifically to FIG. 14, shown therein is a system block diagram further detailing system 700 of FIG. 13. In a simplified demonstrative example, a customer may speak into an audio capture device 716, with the following speech "Hi, can I please get a medium coffee, no, sorry, large coffee, with two sugars, and a chocolate muffin?", This speech may be converted to transcript data 748 by module 708. This transcript data 748 may be provided to D-GNG network 712. The D-GNG network 712 may process this transcript data, as described above, into parsed dialogue transcript data 714, which may comprise the following text: "large coffee, two sugars; chocolate muffin".

This parsed dialogue transcript data 714 may be provided to large language model 750 as an input, along with business memory data 754, and optionally, transcript data 748. In some examples, raw transcript data 748 may not be provided to large language model 750, as the relevant information contained within the transcript data 748 is present in parsed dialogue transcript data 714. In other examples, such data may be provided, as such unparsed transcript data 748 may include additional information, which may be especially useful for the generation of analytics, such as mistaken product names.

In some examples, the input data to large language model 750 may be passed through prompt pre-processor 758. The prompt pre-processor 758 may arrange the input data into a format amendable to large language model 750. For example, parsed dialogue transcript data 714 may comprise the following text: "large coffee, two sugars; chocolate muffin", and business memory data may include a list of the current product stock of all products. The prompt pre-processor 758 may remove irrelevant product stock data from business memory data and include only coffee and muffin stock data in some examples. Next, the prompt pre-processor 758 may arrange the input data into a format amendable for input to the large language model 750 (e.g. concatenation of input data). In some examples, pre-processor 758 may insert guiding or instructional phrases into the large langue model 750 input, describing the purpose of each input, as well as output formatting and content expectations. Such guiding or instructional phrases may be formatted approximately in the style of natural human language.

Large language model 750 may generate an output (e.g. transcript summarization data 760) according to the input. For example, this data 760 may include a machine-readable summary of the customer order. In the previous demonstrative example, transcript summarization data 760 may comprise: "add 1 large coffee—two sugars; add 1 chocolate muffin; response: certainly, can we get you anything else?". This transcript summarization data 760 includes machine readable order information in a standard format, followed by response data, which may be extracted into natural language response data 756. This natural language response data 756 may be played back to a customer using a text to speech system, resulting in a conversational, automated order taking system. In examples wherein system 700 is applied to analytics generation only, such response data 756 may not be generated by model 750.

After the generation of these outputs by large language model 750, the customer may provide further speech to audio capture device 716 to continue this interaction. Large language model 750 may retain memory of the customer's previous speech, and account for this information in any subsequent answers. In some examples, large language model 750 may be reset, or refreshed after each customer completes their interaction, preparing system 700 for the next customer interaction.

In some examples, transcript summarization data 760 may be provided to a POS system 752 for taking customer orders, and passed to internal restaurant systems for further preparation. In other examples, transcript summarization data 760 may be transmitted over network 746 for storage (e.g. in a cloud storage instance or database) or stored locally on device 702 for further processing and analytics generation purposes. In some examples, transcript summarization data 760 may be stored in database format.

While in this demonstrative example, certain forms of data were depicted by text, however, in other examples, such data may comprise strings of numbers or characters, functions, objects, JSON objects or any other format known in the art which may contain the data contained by each component.

In a variation of this demonstrative example, business memory data 754 may indicate to large language model 750 that the stock level of chocolate muffins is zero, stock level of blueberry muffins is 3, and that the stock of chocolate muffins will be increased in 12 minutes. In this alternative example, transcript summarization data 760 may comprise: "add 1 large coffee—two sugars; response: sorry, we are baking more chocolate muffins now, but it'll be 12 more minutes. Would you like a blueberry muffin instead?". In this example, large language model may synthesize information from both the received parsed dialogue transcript data 714 and business memory data 754, to provide the customer with a natural, and informative response.

In another embodiment, D-GNG network 712 may be absent from system 700, and transcript data 748 may be fed directly into large language model 750 (along with business memory data 754 in some examples). In examples wherein D-GNG network 712 is absent, large language model 750 may directly parse transcript data, without requiring pre-processing by D-GNG network 712.

Figure 15:
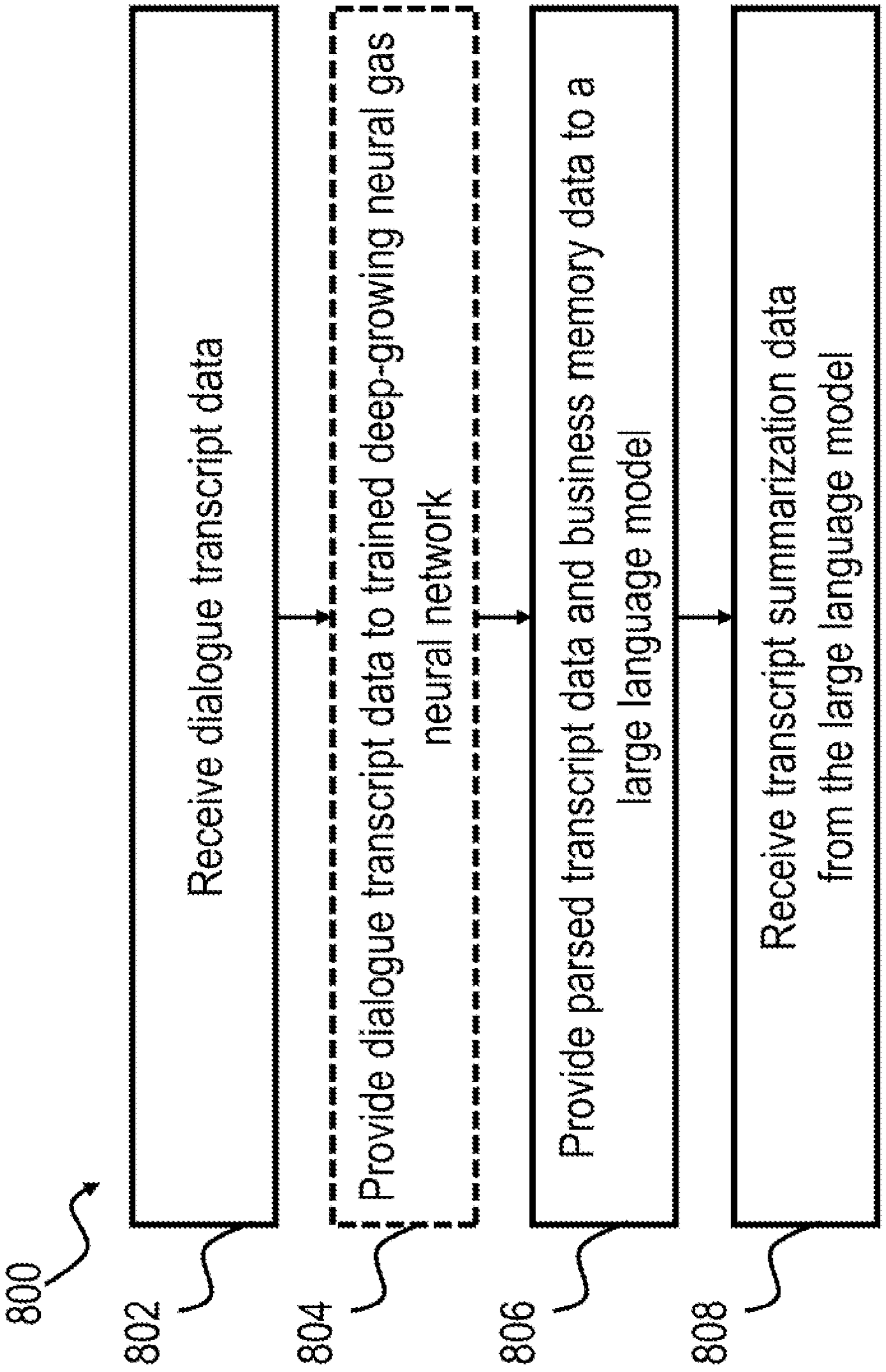
FIG. 15 is a flow chart of a computer implemented method of dialogue parsing, according to another embodiment.

Referring now to FIG. 15, shown therein is a method 800 of parsing dialogue, according to an embodiment. Method 800 includes 802, 806, 808 and optionally, 804. Method 800 may be conducted at least partially by the systems described herein, for example, system 700 of FIG. 13.

At 802, dialogue transcript data is received. For example, dialogue transcript data may be received from speech recognition module 708, and may originate from dialogue audio captured by an audio capture device.

At 804, dialogue transcript data is provided to a trained deep-growing neural gas neural network. The trained deep-growing neural gas neural network may output parsed dialogue transcript data in response, as described previously.

At 806, parsed transcript data and business memory data is provided to a large language model as an input.

At 808, transcript summarization data is received from the large language model as an output.

As described previously in reference to FIGS. 1 to 12, the method 800 and system 700 described herein may be applied to automated customer service and/or order taking systems, according to some embodiments. In such examples, a customer may interact with system 700 instead of a human operator. Customer speech may be captured, and natural human form responses may be relayed to the customer (e.g. in text format or audibly, using a text to speech method and audio device). Such responses may be generated by large language model 750, or by other components of system 700. In some examples, a human operator may be available on standby to intervene in the event of unusual behaviors by system 700.

In other embodiments, the method 800 and system 700 described herein may be applied to analytics systems. Such systems may passively capture audio of dialogue (e.g. customer and employee interactions at a quick service restaurant), and generate insights, analytics and other data according to the captured interaction. Such interaction data may be transmitted (e.g. over network 746) or stored (e.g. on device 702) for further analysis, consideration and/or processing.

While the above description provides examples of one or more apparatus, methods, or systems, it will be appreciated that other apparatus, methods, or systems may be within the scope of the claims as interpreted by one of skill in the art.

The invention claimed is:

1. A method for dialogue parsing, the method comprising:
- training a deep-growing neural gas neural network by:
  - extending a dataset to a deep neural network;
  - arranging a first subset of the dataset into a layered topology, comprising L layers, to form an untrained deep-growing neural gas neural network structure;
  - generating a trained deep-growing neural gas neural network, by:
    - receiving tagged training data at the deep-growing neural gas neural network;
    - grouping individual words of the tagged training data into concepts, contexts, and objects;
    - converting the contexts, concepts, and objects into intents;
    - converting the individual words into object node data, wherein the object node data has an object node structure comprising a left-intent, left-object, left-context, current word, concept, current-object, and right-context;
    - converting words in the object node structure into word embeddings; and
    - providing the object node data, in the form of word embeddings, as a training set to the untrained deep-growing neural gas neural network;
- receiving dialogue transcript data at the trained deep-growing neural gas neural network;
- pre-processing the dialogue transcript data to generate pre-processed dialogue transcript data;
- providing the pre-processed dialogue transcript data as an input to the trained deep growing neural gas neural network;
- receiving parsed dialogue transcript data as an output from the trained deep growing neural gas neural network; and
- providing the parsed dialogue transcript data to a large language model.

2. The method of claim 1, wherein pre-processing dialogue transcript data comprises:
- applying word embeddings to dialogue transcript data to convert words into word embeddings; and applying a concept dictionary to the words of dialogue transcript data to associate words of dialogue transcript data to concepts.

3. The method of claim 1, further comprising:

collecting audio stream data, wherein the audio stream data comprises human dialogue; and applying a speech recognition algorithm to audio stream data to generate dialogue transcript data.

4. The method of claim 3, wherein the audio stream data comprises quick service restaurant order audio.

5. The method of claim 1, further comprising:

collecting audio stream data; and diarizing audio stream data, generating sequenced speech data.

6. The method of claim 5, wherein diarizing audio stream data comprises:

extracting features of audio stream data;

separating audio stream data into data chunks; and providing chunked audio stream data to a trained speech sequencing module.

7. The method of claim 6, wherein audio stream data comprises quick service restaurant order audio.

8. The method of claim 6, wherein the trained speech sequencing module is trained is generated by providing speech sequencing training data to an untrained trained speech sequencing module to train the trained speech sequencing module.

9. A system for dialogue parsing, the system comprising:

a memory, configured to store dialogue transcript data; and a processor, coupled to the memory, configured to execute a dialogue pre-processing module and a trained deep-growing neural gas neural network;

wherein the processor is configured to receive the dialogue transcript data from the memory, pre-process the dialogue transcript data using the dialogue pre-processing module to generate pre-processed dialogue transcript data, provide the pre-processed dialogue transcript data to the trained deep-growing neural gas neural network as an input, receive parsed dialogue transcript data from the trained deep-growing neural gas neural network as an output, and provide the parsed dialogue transcript data to a large language model; and wherein the processor trains the deep-growing neural gas neural network by:

extending a dataset to a deep neural network;

arranging a first subset of the dataset into a layered topology, comprising L layers, to form a deep-growing neural gas neural network structure;

generating the trained deep-growing neural gas neural network by:

receiving tagged training data at the deep-growing neural gas neural network;

grouping individual words of the tagged training data into concepts, contexts, and objects;

converting the contexts, concepts, and objects into intents;

converting the individual words into object node data, wherein the object node data has an object node structure comprising a left-intent, left-object, left-context, current word, concept, current-object, and right-context;

converting words in the object node structure into word embeddings; and providing the object node data, in the form of word embeddings, as a training set to the untrained deep-growing neural gas neural network.

10. The system of claim 9, wherein the system further comprises:

an audio capture device, configured to capture audio stream data, and provide the audio stream data to the memory for storage; and wherein the processor further comprises a speech recognition module, configured to receive audio stream data from the memory as an input, generate dialogue transcript data as an output and transmit dialogue transcript data to the memory for storage.

11. The system of claim 10, wherein audio stream data comprises quick service restaurant order audio.

12. The system of claim 9, wherein pre-processing dialogue transcript data comprises:

applying word embeddings to dialogue transcript data to convert words into word embeddings; and applying a concept dictionary to the words of dialogue transcript data to associate words of dialogue transcript data to concepts.

13. The system of claim 9, further comprising:

an audio capture device, configured to capture audio stream data, and provide the audio stream data to the memory for storage; and wherein the processor further comprises a diarizing module, configured to receive audio stream data from the memory as an input, generate sequenced speech data as an output and transmit sequenced speech data to the memory for storage.

14. The system of claim 13, wherein generate sequenced speech data comprises:

extracting features of audio stream data;

separating audio stream data into data chunks; and providing chunked audio stream data to a trained speech sequencing module.

* * * * *